US012634174B2

(12) United States Patent
Chen et al.

(10) Patent No.: US 12,634,174 B2
(45) Date of Patent: May 19, 2026

(54) DIFFERENTIAL CHANNEL CIRCUIT STRUCTURE AND METHOD OF TRANSMITTING SIGNALS BY THE DIFFERENTIAL CHANNEL

(71) Applicant: National YANG MING Chiao Tung University, Hsinchu (TW)

(72) Inventors: Wei-Zen Chen, Hsinchu (TW); Hsiao-Ming Lin, Hsinchu (TW); Hao-kai Mo, Hsinchu (TW)

(73) Assignee: NATIONAL YANG MING CHIAO TUNG UNIVERSITY, Hsinchu City (TW)

( * ) Notice: Subject to any disclaimer, the term of this patent is extended or adjusted under 35 U.S.C. 154(b) by 86 days.

(21) Appl. No.: 18/416,167

(22) Filed: Jan. 18, 2024

(65) Prior Publication Data

US 2024/0267263 A1 Aug. 8, 2024

(30) Foreign Application Priority Data

Feb. 3, 2023 (TW) ................................ 112103928

(51) Int. Cl.
H04L 25/02 (2006.01)

(52) U.S. Cl.
CPC ...... H04L 25/0272 (2013.01); H04L 25/0276 (2013.01); H04L 25/0278 (2013.01)

(58) Field of Classification Search
CPC .............. H04L 25/026; H04L 25/0264; H04L 25/0272; H04L 25/0276; H04L 25/0278; H04L 25/028

USPC ......... 375/219, 220, 257; 333/17.3, 32, 124, 333/130; 370/282, 284
See application file for complete search history.

(56) References Cited

U.S. PATENT DOCUMENTS

| | | | | |
|---|---|---|---|---|
| 5,659,273 A | * | 8/1997 | Harpham | ................ H04L 25/08 |
| | | | | 333/32 |
| 6,295,323 B1 | | 9/2001 | Gabara | |
| 6,866,065 B2 | | 3/2005 | Camozzi | |
| 2003/0146772 A1 | * | 8/2003 | Chansungsan | ...... H04L 25/0298 |
| | | | | 326/30 |
| 2006/0167666 A1 | * | 7/2006 | Hsu | ........................ G06F 30/367 |
| | | | | 703/2 |
| 2016/0127157 A1 | * | 5/2016 | Wojnowski | ........... H04L 25/085 |
| | | | | 375/257 |
| 2020/0089643 A1 | * | 3/2020 | Shi | ...................... H04L 25/0298 |

* cited by examiner

*Primary Examiner* — Young T. Tse
(74) *Attorney, Agent, or Firm* — Volpe Koenig

(57) ABSTRACT

A differential channel circuit structure is disclosed. The differential channel circuit structure comprises a first differential circuit including a differential channel and a termination circuit. The differential channel has a differential mode impedance and a common mode impedance, and includes a first end and a second end, each capable of processing at least a first differential signal and a first common mode signal. The termination circuit includes a third end and a fourth end connected to the first end and the second end of the differential channel respectively, so as to simultaneously match the differential mode impedance and the common mode impedance of the differential channel.

1 Claim, 29 Drawing Sheets

S10 providing a differential channel with a differential mode impedance and a common mode impedance, wherein the differential channel includes a first end and a second end ⟶S101 providing a termination circuit including a third end and a fourth end, which are connected respectively to the first and second ends of the differential channel ⟶S102 adjusting the termination circuit to simultaneously match the differential mode impedance and the common mode impedance of the differential channel ⟶S103 providing a first input signal and a second input signal ⟶S104 forming a differential signal at the first end and the second end of the differential channel in response to the first input signal, and simultaneously forming a common mode signal at the first end and the second end of the differential channel in response to the second input signal, so that the differential signal and the common mode signal are superimposed on the first end and the second end ⟶S105

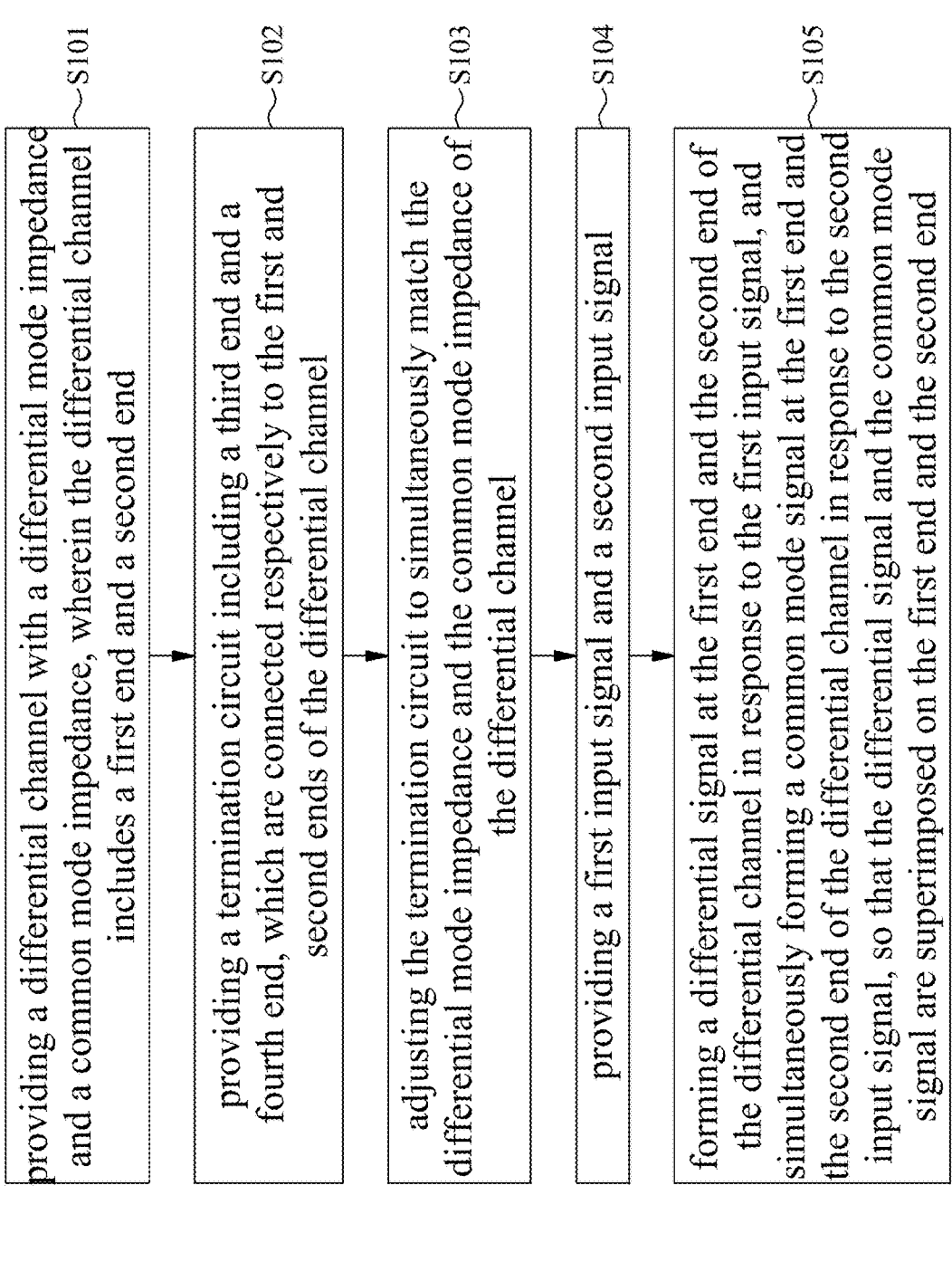

S10 providing a differential channel with a differential mode impedance and a common mode impedance, wherein the differential channel includes a first end and a second end ∽S101 providing a termination circuit including a third end and a fourth end, which are connected respectively to the first and second ends of the differential channel ∽S102 adjusting the termination circuit to simultaneously match the differential mode impedance and the common mode impedance of the differential channel ∽S103 providing a first input signal and a second input signal ∽S104 forming a differential signal at the first end and the second end of the differential channel in response to the first input signal, and simultaneously forming a common mode signal at the first end and the second end of the differential channel in response to the second input signal, so that the differential signal and the common mode signal are superimposed on the first end and the second end ∽S105

Fig. 17

DIFFERENTIAL CHANNEL CIRCUIT STRUCTURE AND METHOD OF TRANSMITTING SIGNALS BY THE DIFFERENTIAL CHANNEL

CROSS-REFERENCE TO RELATED APPLICATION AND CLAIM OF PRIORITY

This application claims the benefit of Taiwan Application No. 112103928, filed on Feb. 3, 2023, at the TIPO. The disclosures of which are incorporated herein in their entirety by reference.

FIELD OF THE INVENTION

The present invention pertains to a differential channel circuit structure, and a method for transmitting signals through a differential channel. More specifically, it relates to a circuit structure and a method for simultaneously transmission of source synchronous data and clock/data on a differential channel.

BACKGROUND OF THE INVENTION

With advancements in manufacturing process technology, semiconductor chips have become smaller, denser, and more power-efficient while still delivering increased computing power. As chip power consumption decreases, the signals required to operate the chips become more susceptible to noise interference. Transmitting differential signals on differential channels has emerged as one of the typical solutions for enhancing and stabilizing signal robustness.

In traditional non-source synchronous technology, the clock channel must extract its clock from the received information, often utilizing additional circuitry such as a phase-locked loop (PLL) for clock data recovery (CDR).

U.S. Pat. No. 6,295,323 discloses a data transmission method and system using differential mode and common mode signals. The disclosed circuit structure can transmit differential and common mode signals in an uncoupled wire channel. However, when transmitting signals in a coupled wire channel, its circuit structure fails to match the odd mode impedance and even-mode impedance of the coupled wire channel simultaneously.

U.S. Pat. No. 6,866,065 discloses a system for improving the signal integrity of differential signals. The disclosed circuit structure can match the odd mode impedance and even-mode impedance of a coupled wire channel simultaneously. However, it does not transmit common mode signals.

SUMMARY OF THE INVENTION

To address the shortcomings of the prior art, the present invention provides a differential channel circuit structure, an impedance-matching terminal circuit, and a method for simultaneous transmission of differential signals and common mode signals in the same differential channel and impedance-matching termination circuit. The differential channel and impedance-matching termination circuit together form a transmitting circuit. The differential channel such as a coupled transmission line is coupled to a coupled transmission end. The differential channel and impedance-matching terminal circuit are electrically coupled to a first current driver and a second current driver, and a common mode bias voltage is provided to the impedance-matching termination circuit. Under the condition of the common mode bias voltage, the first current driver generates a differential signal on the coupled transmission end of the transmission line in response to a first input signal, while the second current driver generates a common-mode signal on the coupled transmission end of the transmission line in response to a second input signal. The differential signal and the common-mode signal are superimposed and exhibit an orthogonal characteristic within the circuitry. The differential channel and the impedance-matching termination circuit can also form a receiving circuit, electrically coupled to the coupled transmission line. The differential channel is connected to a first receiver, and the impedance-matching termination circuit is connected to a second receiver. The common mode bias voltage is provided to an impedance-matching termination circuit of the receiving end. Alternatively, the impedance-matching termination circuit of the receiving end may not require a common mode bias voltage, with the bias voltage being determined by the common mode bias voltage of the transmitting end. The first receiver outputs a first output signal in response to the differential signal from the transmitting circuit, and the second receiver outputs a second output signal in response to the common mode signal from the transmitting circuit.

The differential signal and common mode signal each experience a propagation delay after passing through the circuit at the transmission end. The propagation delays of the two signals can be pre-designed to maintain a predetermined relationship between them. Based on this predetermined relationship, the numerical relationships between self-capacitance and mutual capacitance, self-inductance and mutual inductance, as well as odd mode impedance and even-mode impedance for the coupled wire channel can be determined. The circuit designer can then select impedance-matching parameters for the impedance-matching termination circuit based on these numerical relationships. The selected impedance-matching parameters can simultaneously satisfy the predetermined relationship, the differential channel, and the impedance-matching requirements of the termination circuit. If either the differential signal or the common mode signal is a clock, and both signals are source-synchronized, the need for a separate CDR circuit is eliminated, thus avoiding clock skew caused by data and clock transmissions through different channels.

In accordance with one aspect of the present invention, a differential channel circuit structure is disclosed. The differential channel circuit structure comprises a first differential circuit including a differential channel and a termination circuit. The differential channel possesses a differential mode impedance, a common mode impedance, and includes a first and a second end for processing at least a first differential signal and a first common mode signal. The termination circuit includes a third end and a fourth end, electrically connected to the first end and second end of the differential channel, respectively, in order to simultaneously match the differential mode impedance and the common mode impedance of the differential channel.

In accordance with another aspect of the present invention, a method for constructing signal transmission in a differential channel is disclosed. The method comprises the following steps: providing a differential channel with a differential mode impedance and a common mode impedance, wherein the differential channel includes a first end and a second end; providing a termination circuit including a third end and a fourth end, electrically connected to the first and second ends of the differential channel; causing the termination circuit to simultaneously match the differential mode impedance and the common mode impedance of the differential channel; providing a first input signal and a second input signal; forming a differential signal at the first and second ends of the differential channel in response to the first input signal, and simultaneously forming a common mode signal at the first second ends of the differential channel in response to the second input signal. This results in the superimposition of the differential signal and the common mode signal at the first and second ends.

In accordance with a further aspect of the present invention, a differential channel circuit architecture is disclosed. The architecture comprises a differential channel, a common mode signal driving terminal, a differential signal receiving terminal and a common mode signal receiving terminal. The differential channel is configured to transmit at least a differential signal and a common mode signal. The common mode signal driving terminal is connected to the differential channel and utilize a first reference clock as the reference clock for the common mode signal. The differential signal receiving terminal is connected to the differential channel and uses the first reference clock as well. The common mode signal receiving terminal is connected to the differential channel and incorporates a clock data recovery (CDR) circuit, which extracts a first signal clock from the common mode signal. The differential signal driving terminal is connected to the differential channel and uses the first signal clock as the reference clock for the differential signal, with the first signal clock being related to the first reference clock.

The above objectives and advantages of the present invention will become more readily apparent to those ordinarily skilled in the art after reviewing the following detailed descriptions and accompanying drawings, in which:

BRIEF DESCRIPTION OF THE DRAWINGS

FIG. 17 is a schematic diagram of the method of transmitting signals in the differential channel structure according to a preferred embodiment of the present disclosure;

DETAILED DESCRIPTION OF THE PREFERRED EMBODIMENTS

Please read the following detailed description with reference to the accompanying drawings of the present disclosure. The accompanying drawings of the present disclosure are provided as examples to introduce various embodiments of the present disclosure and to facilitate understanding of how to implement the present disclosure. The embodiments of the present disclosure provide sufficient information for those skilled in the art to implement the embodiments of the present disclosure or derive embodiments from the content of the present disclosure. It should be noted that these embodiments are not mutually exclusive, and some embodiments can be appropriately combined with one or more embodiments to form new embodiments. In other words, the implementation of the present disclosure is not limited to the examples disclosed below. Furthermore, for the sake of brevity and clarity, certain details are not excessively disclosed in each embodiment, and even if specific details are provided, they are used for illustrative purposes to aid reader's understanding. The present invention will now be described in more detail with reference to the following embodiments. It is important to note that the following descriptions of the preferred embodiments of this invention are presented herein for the purposes of illustration and description only; they are not intended to be exhaustive or to limit to the precise form disclosed.

Figure 1:
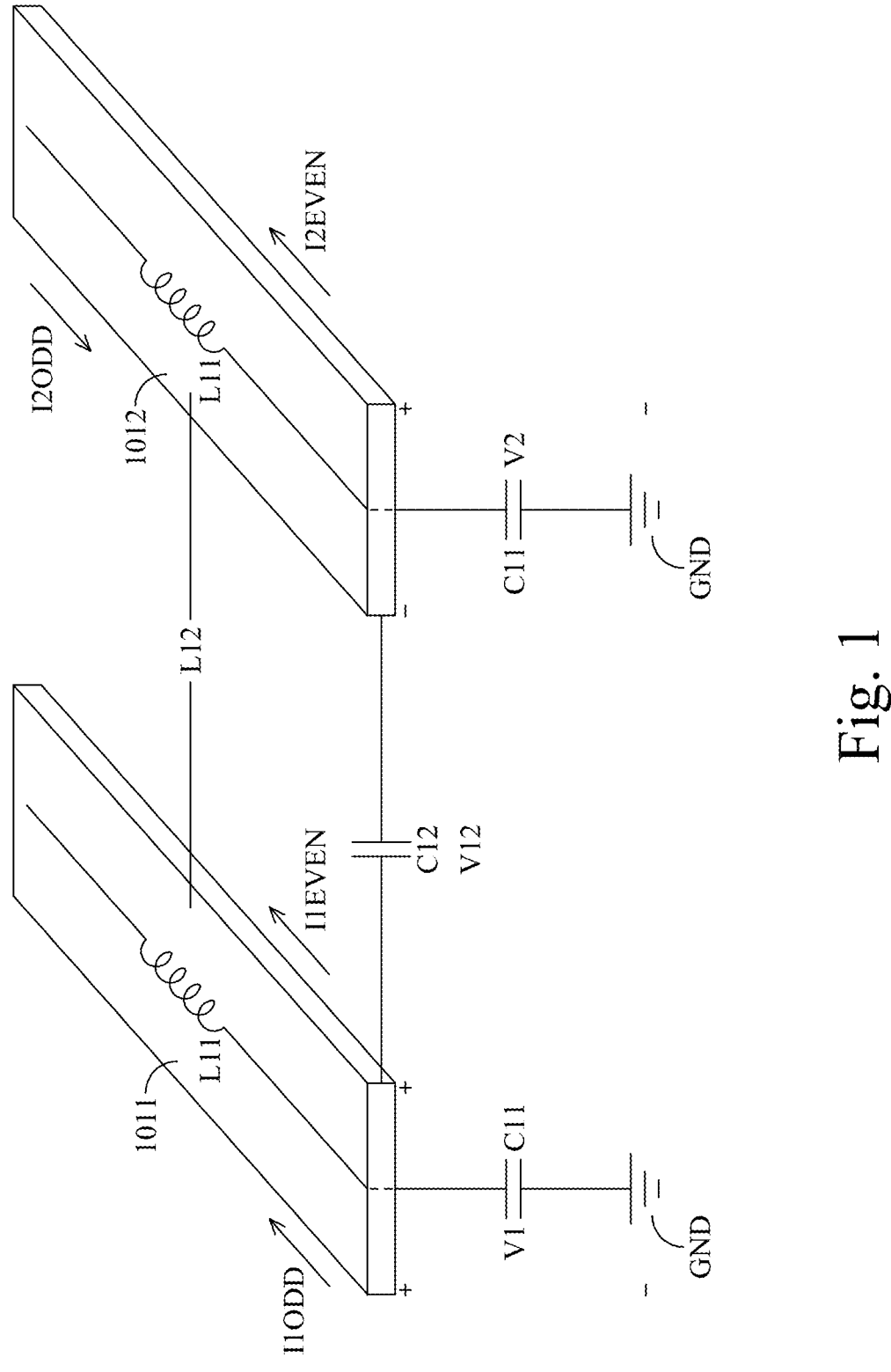
FIG. 1 illustrates a schematic diagram showing an equivalent circuit of a differential channel in the circuit structure of FIG. 2 according to a preferred embodiment of the present disclosure.
Figure 2:
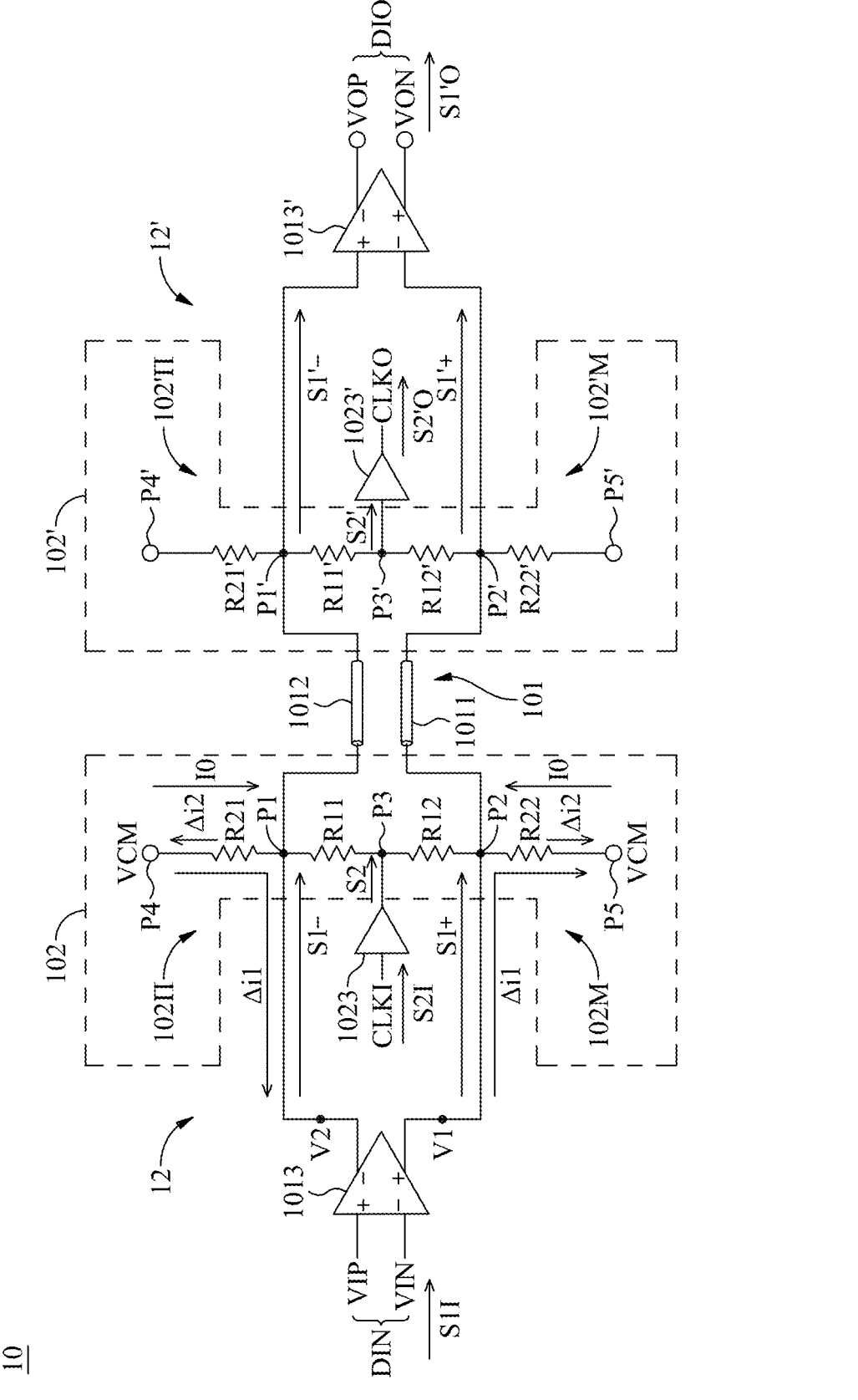
FIG. 2 illustrates a schematic diagram of a circuit structure for simultaneously transmitting a data signal and a clock signal in a differential channel according to a preferred embodiment of the present disclosure.

Please refer to FIG. 1, which is a schematic diagram of an equivalent circuit of the differential channel 101 in the circuit structure 10 of FIG. 2 according to a preferred embodiment of the present disclosure. In FIG. 1, the differential channel 101 comprises a pair of transmission lines 1011 and 1012, for example. The transmission lines 1011 and 1012 are used to transmit differential signals VIP and VIN. Each of the transmission line 1011 and the transmission line 1012 has a capacitance C11 to the ground GND as well as self-inductance L11. There is also a mutual inductance L12 and a mutual capacitance C12 between the transmission line 1011 and 1012. The voltage of the single transmission line 1011 with respect to the ground GND is denoted as V1, and the voltage of the single transmission line 1012 with respect to the ground GND is denoted as V2. The voltage difference between voltage V1 and V2 is defined as the differential voltage VDIFF=V1−V2. The voltage to ground on both transmission lines 1011 and 1012 simultaneously is defined as the common mode voltage VCOMM=(½)×(V1+V2). The common-mode voltage VCOMM can be considered as (DC or AC) bias voltage, while the differential voltage can be considered as the AC voltage superimposed on the DC bias voltage. From the above two equations, we can derive V1=VCOMM+(½)× VDIFF, and V2=VCOMM−(½)×VDIFF. Therefore, the positive phase differential voltage (½)×V$_{DIFF}$ can be applied to transmission line 1011 of the differential channel 101, while the negative phase differential voltage (½)×V$_{DIFF}$ can be applied to transmission line 1012.

In FIG. 1, when the differential signals VIP and VIN are operating in differential mode, they are transmitted on the pair of transmission lines 1011 and 1012 with the same amplitude but opposite phases. The sum of the voltage of each individual transmission line 1011 or 1012 with respect to ground GND, denoted as V1 or V2, and the induced voltage V12 between the two transmission lines can be represented as VODD, wherein $$VODD = L11\frac{dI1ODD}{dt} + L12\frac{dI2ODD}{dt}. \qquad \text{(Equation 1)}$$

Since the phase of differential signal VIP is opposite to that of the differential signal VIN, it can be observed that the current change dI2 in the transmission line 1012 is opposite to the current change dI1 in transmission line 1011, i.e., dI2=−dI1. Substituting this into Equation 1 yields $$VODD = (L11 - L12)\frac{dI1ODD}{dt}. \qquad \text{(Equation 2)}$$

Therefore, the odd mode inductance LODD=L11−L12 (Equation 5) of each individual transmission line 1011 or 1012 in the differential channel 101 can be determined.

In FIG. 1, when the differential signals VIP and VIN are operated in the common mode, they are transmitted on the pair of transmission lines 1011 and 1012 with the same amplitude and phase. The sum of the voltage of a single transmission line 1011 or 1012 with respect to ground GND, denoted as V1 or V2, and the induced voltage V12 between the two transmission lines is represented as VEVEN. This can be expressed as $$VEVEN = L11\frac{dI1EVEN}{dt} + L12\frac{dI2EVEN}{dt}. \qquad \text{(Equation 3)}$$

Since the phase of the differential signals VIP and VIN is the same, it can be observed that the current change dI2 in transmission line 1012 is the same as the current change dI1 of the transmission line 1011, i.e., dI2=dI1. Substituting this into Equation 3 gives $$VEVEN = (L11 + L12)\frac{dI1EVEN}{dt}. \qquad \text{(Equation 4)}$$

Therefore, the even-mode inductance LEVEN=L11+L12 (Equation 6) of a single transmission line 1011 or 1012 in the differential channel 101 can be determined.

In FIG. 1, when the differential signals VIP and VIN are operated in differential mode, they are transmitted on the pair of transmission lines 1011 and 1012 with the same amplitude but opposite phases. The amplitude between the differential signal VIP and the differential signal VIN doubles, resulting in a doubling of the mutual capacitance between the two transmission lines 1011 and 1012 (C12). Additionally, there is the capacitance of the single transmission line 1011 or 1012 to the ground GND, leading to the odd mode capacitance CODD=C11+2C12 (Equation 7).

In FIG. 1, when the differential signals VIP and VIN are operated in the common mode, they are transmitted on the pair of transmission lines 1011 and 1012 respectively with the same amplitude and phase. Since there is no amplitude difference between the differential signals VIP and VIN, the mutual capacitance C12 between the two transmission lines 1011 and 1012 becomes zero. In this case, the even-mode capacitance $C_{EVEN}$ is determined by the capacitance $C_{11}$ of the single transmission line 1011 or 1012 to ground GND, resulting in $C_{EVEN}=C_{11}$ (Equation 8).

To summarize, the following parameters of the single transmission lines 1011 or 1012 in the differential channel 101 can be obtained:

Odd mode inductance $LODD=L11-L12$     (Equation 5);

Even-mode inductance $LEVEN=L11+L12$     (Equation 6);

Odd mode capacitance $CODD=C11+2C12$     (Equation 7);

Even mode capacitance $CEVEN=C11$     (Equation 8);

The odd mode impedance $Z_{ODD}$ can be obtained from Equations 5, 7 and 9, the even-mode impedance can be obtained from Equations 6, 8, and 11 as follows:

Odd mode impedance $$Z_{ODD} = \sqrt{\frac{L_{ODD}}{C_{ODD}}}, \qquad \text{(Equation 9)}$$

and substituting Equations 5 and 7 into Equation 9 gives $$Z_{ODD} = \sqrt{\frac{L_{11} - L_{12}}{C_{11} + 2 \cdot C_{12}}}; \qquad \text{(Equation 10)}$$

Even-mode impedance $$Z_{EVEN} = \sqrt{\frac{L_{EVEN}}{C_{EVEN}}}, \qquad \text{(Equation 11)}$$

and substituting Equations 6 and 8 into Equation 11 gives $$Z_{EVEN} = \sqrt{\frac{L_{11} + L_{12}}{C_{11}}}; \qquad \text{(Equation 12)}$$

Odd mode propagation delay $T_{D\text{-}ODD}=$
$\sqrt{V(L_{ODD}) \cdot (C_{ODD})} = \sqrt{(L_{11}-L_{12}) \cdot (C_{11}+2 \cdot C_{12})}$   (Equation 13);

Even-mode propagation delay $T_{D\text{-}EVEN}=$
$\sqrt{(L_{EVEN}) \cdot (C_{EVEN})} = \sqrt{(L_{11}+L_{12}) \cdot (C_{11})}$   (Equation 14).

In the differential mode transmission mode, the differential mode impedance ZDIFF is the impedance between the two transmission lines 1011 and 1012, and the odd mode impedance ZODD is the impedance of a single transmission line 1011 or 1012 with respect to ground GND. The relationship between $Z_{DIFF}$ and $Z_{ODD}$ is given by ZDIFF=2× ZODD (Equation 15). In the common mode transmission mode, the common mode impedance ZCOMM is the impedance of the two transmission lines 1011 and 1012 with respect to ground GND, and the even mode impedance ZEVEN is the impedance of a single transmission line 1011 or 1012 with respect to the ground GND. The relationship between $Z_{COMM}$ and $Z_{EVEN}$ is given by $Z_{COMM}=(\frac{1}{2})*Z_{EVEN}$ (Equation 16). Please refer to FIG. 2, which shows a schematic diagram of a circuit structure 10 for simultaneously transmitting a data signal DIN and a clock signal CLKI in a differential channel according to a preferred embodiment of the present disclosure. The circuit structure 10 includes a differential channel 101 and a termination circuit 102.

In FIG. 2, the terminal circuit 102 is an impedance-matching termination circuit 102M. The differential channel 101 is responsible for transmitting or receiving the differential signals VIP and VIN to deliver data. According to Equations 13 and 14, the differential channel 101 has parameters including an odd mode propagation delay $T_{D\text{-}ODD}$ and an even mode propagation delay $T_{D\text{-}EVEN}$, where there is a specific relationship between $T_{D\text{-}ODD}$ and $T_{D\text{-}EVEN}$. The impedance-matching termination circuit 102M is connected to the differential channel 101 at its two ends, P1 and P2. The differential channel 101 may include transmission lines 1011, 1012 for transmitting or receiving the differential signals VIP, VIN. It also provides a bias voltage (such as a common mode bias voltage VCM) to the impedance-matching termination circuit 102M for transmitting or receiving the clock signal CLKI. The impedance-matching termination circuit 102M is designed based on the specific relationship, so that the differential channel 101 and the impedance-matching termination circuit 102M forms an impedance-matching. In any embodiment of the present disclosure, the common mode bias voltage VCM is ranged from a supply voltage to ground voltage, preferably a middle voltage range therebetween, so that the supply voltage can afford to a swing amplitude of a common mode signal based on the bias voltage VCM as a central reference voltage level, i.e., a bias operating point.

In the preferred embodiment of FIG. 2, the circuit structure 10 includes a transmitting circuit 12 and a receiving circuit 12'. The transmitting circuit 12 includes drivers 1013, 1023 for transmitting the first signal S1+, S1− and the second signal S2 respectively. The terminal circuit 102 is also part of the transmitting circuit 12. The first signal S1+ and S1− and the second signal S2 are associated with the data signal DIN, the clock signal CLKI, or a control signal (not shown). The receiving circuit 12' includes drivers 1013', 1023' and terminal circuits 102' for receiving the first signal S1'+, S1'− and the second signal S2'. The first S1'+ and S1'− and the second signal S2' are associated with the data signal DIO, the clock signal CLKO, or a control signal (not shown). The first driver 1013 and the second driver 1023 in the transmitting circuit 12 are connected to the transmission lines 1011, 1012, and the first driver 1013' and the second driver 1023' in the receiving circuit 12' are connected to the transmission lines 1011, 1012. The input of the first driver 1013 in the transmitting circuit 12 can be interchangeable with the output of the first driver 1013' to allow VIP and VIN to be input from the first driver 1013', and VOP and VON to be output by the first driver 1013. This means that some functions of the transmitting circuit 12 and the receiving circuit 12' can be interchanged. Additionally, when the data signal DIN is transmitted from the transmitting circuit 12 to the receiving circuit 12', the clock signal CLKI can also be transmitted from the receiving circuit 12' to the transmitting circuit 12. The transmission direction of the data signal DIN and the clock signal CLKI can be the same or opposite.

The impedance-matching terminal circuit 102M in the transmission circuit 12 of FIG. 2 can be a π-type network termination circuit or a T-type network termination circuit.

9
10

Similarly, the impedance-matching termination circuit 102'M in the receiving circuit 12' can also be a π-typed network termination circuit or a T-typed network termination circuit. This allows for different circuit structures 10 to be combined. The termination circuit 102 in the transmitting circuit 12 is connected to the first driver 1013 and the second driver 1023, while the termination circuit 102' in the receiving circuit 12' is connected to the first driver 1013' and the second driver 1023'. In the receiving circuit 12', the first driver 1013' and the second driver 1023' function as receivers.

The terminal circuits 102, 102' in FIG. 2 are described as IT-type network termination circuits. Please refer to FIGS. 1, 2, as well as equations 10, 12, 13-14. The T-type network termination circuit 102π and 102'π include an intermediate point P3, P3', a first first resistor R11, R11' with first resistance value R1, a first second resistor R12, R12' with first resistance value R1, a second first resistor R21, R21' with second resistance value R2, and a second second resistor R22, R22' with second resistance value R2. One end of the first first resistor R11, R11' and the first second resistor R12, R12' is connected to the intermediate point P3, P3', and the other end of the two (i.e., the endpoint P1, P1' and terminals P2, P2' respectively) are connected to the second first resistor R21, R21' and the second second resistor R22, R22' respectively. The other ends of the second first resistor R21, R21' and the second second resistor R22, R22' are terminals P4, P4' and terminals P5, P5' respectively. Terminals P4 and P5 receive the common mode bias voltage VCM, and terminals P4' and P5' are short circuited. The impedance-matching terminal circuit 102' does not require a common mode bias voltage VCM and its bias voltage can be determined by the impedance-matching termination circuit 102. The intermediate point P3 is coupled to the clock signal CLKI, and the intermediate point P3' is coupled to the output clock signal CLKO. Alternatively, the intermediate point P3' can be coupled to the clock signal CLKI, while the intermediate point P3 is coupled to the output clock signal CLKO. In another embodiment, the two ends P1 and P2 can also be coupled to the clock signal CLKI, while the two ends P1' and P2' are coupled to the output clock signal CLKO. The two ends P1' and P2' can also be coupled to the clock signal CLKI, while the two ends P1 and P2 are coupled to the output clock signal CLKO.

In FIG. 2, the first driver 1013 can be a voltage driver or a current driver, preferably a current driver, and the second driver 1023 can be a voltage driver or a current driver. In the embodiment shown in FIG. 2, both the first driver 1013 and the second driver 1023 are current drivers, illustrating the impedance-matching between the differential channel 101 and the terminal circuit 102 of the circuit structure 10 as follows. Impedance-matching between the transmission lines 1011 and 1012 and the termination circuit 102 can be achieved by selecting an appropriate first resistance value R1 and a second resistance value R2. In the differential mode, both the endpoint P4 of the second first resistor R21 and the endpoint P5 of the second resistor R22 receive the common mode bias voltage VCM having the same potential, which can be considered as a short circuit. Therefore, the differential mode impedance ZDIFF is given by $$ZDIFF = (R1 + R1)\|(R2 + R2) = \frac{2R1 \times R2}{R1 + R2}.$$

According to Equation 15, ZDIFF=2ZODD, so $$ZDIFF = \frac{2R1 \times R2}{R1 + R2} = 2ZODD, ZODD = \frac{R1 \times R2}{R1 + R2}. \quad \text{(Equation 17)}$$

In the common mode, the potentials of the terminals P1 and P2 are equal. Consequently, the first first electrical resistor R11 and the first second resistor R12 can be treated as an open circuit. As a result, the common mode impedance $$ZCOM = R2\|R2 = \frac{1}{2}R2.$$

Referring to Equation 16, $$ZCOMM = \frac{1}{2}ZEVEN, \quad \text{(Equation 18)}$$

$$\text{so } ZCOMM = \frac{1}{2}R2 = \frac{1}{2}ZEVEN, R2 = ZEVEN,$$

and substituting ZEVEN into Equation 17 can get $$ZODD = \frac{R1 \times ZEVEN}{R1 + ZEVEN}, \quad \text{(Equation 19)}$$

$$R1 \times ZODD + ZEVEN \times ZODD = R1 \times ZEVEN,$$

$$\text{so } R1 = (Z_{EVEN} \times Z_{ODD})/(Z_{EVEN} - Z_{ODD})$$

can be obtained. It can be known from Equation 12 that $$Z_{EVEN} = \sqrt{\frac{L_{11} + L_{12}}{C_{11}}},$$

and from Equation 10 that $$Z_{ODD} = \sqrt{\frac{L_{11} - L_{12}}{C_{11} + 2 \cdot C_{12}}}.$$

It is worth noting that the electrical parameters C11, C12, L11, L12 are influenced by the size and spacing of the transmission lines 1011, 1012, and the dielectric constant of the dielectric. Thus, by appropriately designing the size, distance, and dielectric material of these transmission lines, we can select the values of R1 and R2 to achieve impedance-matching between the transmission lines and the terminal circuit 102.

Please refer to FIGS. 1, 2 and Equations 10, 12, 13-14. To design the differential channel 101, such as L11=3L12 and C11=2C12, we can substitute these values into Equations 10 and 12. This allows us to establish the relationship between the odd mode impedance ZODD and the even mode impedance ZEVEN. Specifically, ZEVEN=2ZODD (Equation 20). By further simplifying Equation 19, we can obtain R1=2ZODD. Furthermore, by substituting L11=3L12 and C11=2C12 into Equations 13 and 14 respectively, we find that the odd mode propagation delay TD-ODD is equal to the even-mode propagation delay TD-EVEN. Therefore, after appropriately selecting the electrical parameters C11, C12, L11, L12, we can ensure that the odd mode propagation delay is equal to the even mode propagation delay.

Continuing from the previous explanation, the operations of the differential signals VIP, VIN of the differential channel 101 and the common mode signal of the terminal circuit 102 are further described as follows. When only the common mode bias voltage VCM is provided, without the first input signal S1I carrying information or the second input signal S2I carrying a clock signal, the voltages at terminals P2 and P1 are both VCM–I0×R2, wherein I0 represents the bias current. In the differential mode, when only the first input signal S1I is provided, the first differential current $\Delta i1$ is generated. As a result, both V1 and V2 become functions of the first differential current $\Delta i1$, that is, V1($\Delta i1$), V2($\Delta i1$). Both terminals P4 and P5 provide the common mode bias voltage VCM to the terminal circuit 102, and the first input signal S1I is only supplied to the first driver 1013. The voltage at endpoint P2 is $$V1 = VCOMM + \frac{1}{2} \ VDIFF,$$

and the voltage at endpoint P1 is $$V2 = VCOMM - \frac{1}{2} \ VDIFF.$$

In this case, terminals P4 and P5 can be regarded as short-circuited, so the equivalent resistance between terminals P1 and P2 is equal to the resistance value of (R11 in series with R12) in parallel with (R21 in series with R22), specifically (R1+R1)∥(R2+R2). When the first driver 1013 is a first current driver, the first differential current $\Delta i1$ generated in response to variations in the first input signal S1I carrying information. This current flows sequentially through the positive output terminal of the first driver 1013, endpoint P2, (R11 in series with R12) in parallel with (R21 in series with R22), and endpoint P1, and then returns to the negative output terminal of the first driver 1013. Therefore, the voltage at the endpoint P2 is $$V1 = VCOMM + \frac{1}{2} \ VDIFF,$$

and the voltage at the endpoint P1 is $$V2 = VCOMM - \frac{1}{2} \ VDIFF.$$

Here, the voltage VCOMM of the common mode signal changes with the clock signal CLKI. When the clock signal CLKI is not provided, the voltage VCOMM of the common mode signal is equal to VCM–I0×R2, and VDIFF varies with the variation of the first differential current $\Delta i1$. The first signal S1+ refers to the signal with a differential component of the voltage V1 at endpoint P2, while first signal S1– refers to the signal with a differential component of voltage V2 at endpoint P1. In simpler terms, the first signal represents the voltage difference V1–V2 between endpoint P2 and endpoint P1.

In common mode, when only the second input signal S2I is provided, $\Delta i2$ is formed. As a result, both V1 and V2 become functions of $\Delta i2$, specifically V1($\Delta i2$), V2($\Delta i2$). Both terminals P4 and P5 provide the common mode bias voltage VCM to the termination circuit 102, and the second input signal S2I is only supplied to the second driver 1023. Since the second driver 1023 is a current driver, the current it generates passes through both the second first resistor R21 and the second second resistor R22. This current is the common mode current $\Delta i2$, which varies with the variation of the second input signal S2I carrying the clock signal CLKI. The voltage at endpoint P2 is $$V1 = VCOMM + \frac{1}{2} \ VDIFF = (VCM - IO \times R2 + \Delta i2R2) + \frac{1}{2} \ VDIFF,$$

and the voltage at endpoint P1 is $$V2 = VCOMM - \frac{1}{2} \ VDIFF = (VCM - IO \times R2 + \Delta i2R2) - \frac{1}{2} \ VDIFF.$$

When the differential signals VIP, VIN are not provided, the voltage VDIFF of the differential signal is zero. In this case, the voltage VCOMM of the common mode signal changes with the variation of $\Delta i2$, and VCOMM=VCM–I0×R2+$\Delta i2$× R2. The second signal S2 refers to a signal that has a common-mode component $\Delta i2$×R2 of the voltages V1 and V2 at terminals P1 or P2. If the differential signals VIP and VIN are provided simultaneously, the voltages of the differential signals VIP and VIN remains V1–V2=VDIFF. This means that the change in the voltage VCOMM of the common mode signal does not affect the voltage VDIFF of the differential signal. The voltage VDIFF of the differential signals VIP, VIN varies with the variation of the first differential current $\Delta i1$ and does not affect the voltage VCOMM of the common-mode signal. Both the differential signal and the common-mode signal have orthogonal characteristics in the circuit. Ideally, the differential signal has a circuit characteristic that is not affected by the second input signal S2I, and the common mode signal ideally has a circuit characteristic that is not affected by the first input signal S1I.

When the common mode bias voltage VCM, the first input signal S1I carrying information, and the second input signal S2I carrying the clock are provided, the voltage V1 at endpoint P2 is a function of $\Delta i1$ and $\Delta i2$ at the same time, and the voltage V2 at endpoint P1 is also a function of $\Delta i1$ and $\Delta i2$, that $$V1(\Delta i1, \Delta i2) = VCOMM + \frac{1}{2} \ VDIFF,$$

$$V2(\Delta i1, \Delta i2) = VCOMM - \frac{1}{2} \ VDIFF.$$

Based on the previous discussion, we can summarize the differential channel circuit structure as follows: it comprises a first differential circuit 10, which consists of a differential channel 101 and a terminal circuit 102. The differential channel 101 is responsible for processing at least one differential signal VIP, VIN and one common mode signal $V_{COMM}$, and possesses a differential mode impedance ZDIFF, a common mode impedance ZCOMM, and includes a first endpoint P1 and a second endpoint P2. The termination circuit 102 includes a third endpoint P1 and a fourth endpoint P2 (overlap with the first and the second terminals respectively) connected to the first endpoint P1 and the second endpoint P2 of the differential channel 101, so as to simultaneously match the differential mode impedance ZDIFF and the common mode impedance ZCOMM of the differential channel 101. Furthermore, it is worth noting that the circuit structure of the receiving circuit 12' follows a similar pattern to that of the transmitting circuit 12. However, since the similarities are apparent, we will not delve into further detail here. Expanding on the previous description, the processing within the circuit involves various combinations. It can encompass simultaneously transmission of the differential signals VIP, VIN and transmission of the common mode signal VCOMM. Furthermore, it allows for scenarios where the circuit simultaneously receiving the differential signals VIP, VIN and receiving the common mode signal VCOMM, simultaneously transmitting the differential signals VIP, VIN and receiving the common mode signal VCOMM, or simultaneously receiving differential signals VIP, VIN and transmitting common mode signal VCOMM. To facilitate these operations, the differential channel 101 is connected to a first driving terminal 1013. The common mode signal VCOMM and the differential signals VIP, VIN have an orthogonal characteristic in circuit. The common mode signal VCOMM (i.e., S2I) is connected to a second driving terminal 1023. The differential signals VIP, VIN carry a first signal S1+, S1− from the first driving terminal 1013. Meanwhile, the common mode signal VCOMM carries a second signal S2 from the second driving terminal 1023. The circuit structure of the receiving circuit 12' follows a similar pattern to that of the transmitting circuit 12, but for the sake of brevity, we will not elaborate further on its details. It is worth emphasizing that in conventional systems, the common-mode signal is typically considered a disturbance signal. It is an undesired interference that is often unavoidable. However, in this disclosure, a different approach is adopted. The common mode signal is utilized as a means to transmit information. By employing the termination circuit to simultaneously match the differential mode impedance and the common mode impedance of the differential channel, the transmission of the information remains unaffected by any disturbances. This innovative approach represents a significant and remarkable advancement, as it addresses the inherent limitations of conventional systems and introduces exceptional progressive features.

In any embodiment of the present disclosure, the termination circuit 102, 102' is an impedance-matching termination circuit 102M, 102'M, the first signal S1+, S1− is associated with a clock signal, a data signal, or a control signal. The second signal S2 is associated with a clock signal, a data signal, or a control signal.

Figure 3:
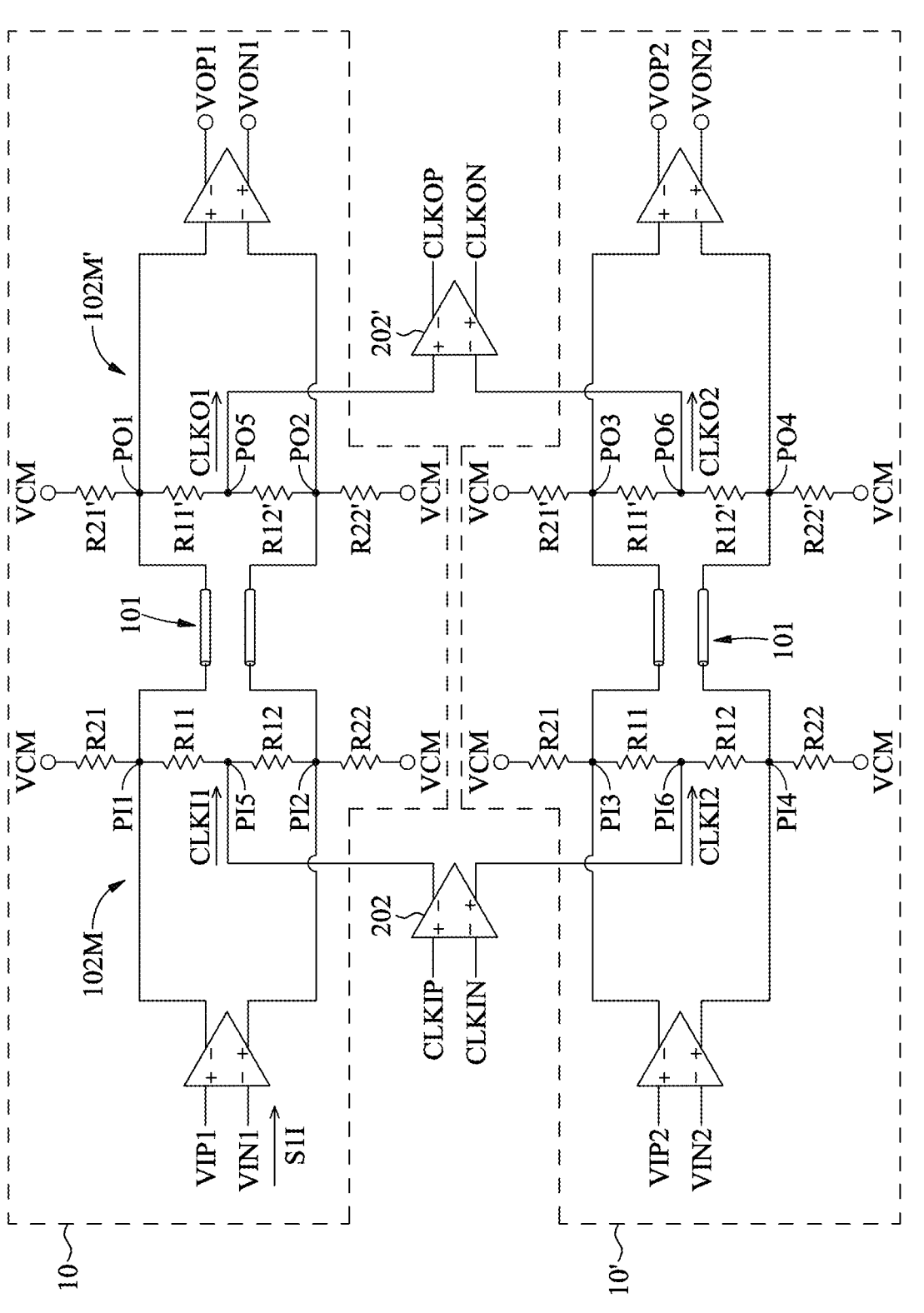
FIG. 3 illustrates a schematic diagram of a circuit structure for simultaneously transmitting a first differential signal, a second differential signal, and a differential common mode signal in a differential channel according to a preferred embodiment of the present disclosure.

In one embodiment, the clock signal CLKI can be provided using a differential signal. Referring to FIGS. 2 and 3, a circuit structure 20 is depicted, which enables the simultaneous transmission of the first differential signal VIP1, VIN1, the second differential signal VIP2, VIN2, and the differential clock signal CLKIP, CLKIN in the differential channel. The circuit structure 20 comprises a first differential circuit 10, which includes a differential channel 101 and impedance-matching termination circuit 102M, 102'M. The differential channel 101 is responsible for transmitting or receiving the differential signal VIP1, VIN1, which carries the first input signal S1I. The impedance-matching termination circuits 102M, 102'M have two ends P1, P1' and P2, P2' connected to the differential channel 101 as shown in FIG. 2 (the two ends PI1, PO1, PI2, PO2 in FIG. 3). These terminal circuits facilitate the transmission or reception of the first common-mode signal CLKI1, which is used to transmit the differential clock signal CLKIP. Additionally, the impedance-matching termination circuits 102M, 102'M are connected to the differential channel 101 via two ends PI3, PO3 and PI4, PO4 as shown in FIG. 3. These ends are utilized for transmitting or receiving the second common mode signal CLKI2, which is responsible for transmitting the differential clock signal CLKIN. Importantly, there exists an orthogonal characteristic between the common mode signal and the differential signals VIP1, VIN1, VIP2, VIN2 in circuitry.

In FIG. 3, the first differential circuit 10 is identical to the one shown in FIG. 2, so there is no need to repeat its description. However, the circuit structure 20 in FIG. 3 includes additional components, namely the second difference circuit 10', the driver 202 and the driver (or receiver) 202'. The second differential circuit 10' is connected to the first differential circuit 10 through the driver 202, and its circuit structure is identical to that of the first difference circuit 10. The second differential circuit 10' comprises the second differential signals VIP2, VIN2 and the second common mode signal CLKI2. The first common mode signal CLKI1 and the second common mode signal CLKI2 together form a differential common mode signal. The transmission direction of the first differential signals VIP1, VIN1, the second differential signals VIP2, VIN2 and the differential common mode signal CLKI1, CLKI2 can be the same or reversed. This means that the first differential signals VIP1, VIN1 or the second differential signals VIP2, VIN2 can have the same or opposite transmission direction as the differential common mode signals CLKI1, CLKI2.

In FIG. 3, the second output signals CLKOP, CLKON are associated with the first common mode signal CLKO1, which can be a first single-ended clock signal. The first differential circuit 10 transmits or receives the first common mode signal CLKO1 through the driver 202'. Similarly, the second output signals CLKOP and CLKON are also associated with a second common mode signal CLKO2, which can be a second single-ended clock signal. The second differential circuit 10' transmits or receives a second common mode signal CLKO2 through the driver 202'. The first common mode signal CLKO1 and the second common mode signal CLKO2 together form differential common model signals CLKO1, CLKO2. The output endpoints PO1, PO2, PO3, PO4, PO5, PO6 shown in FIG. 3 can generate waveforms as illustrated in FIGS. 14A~14G, 15A~15B and 16A~16C. Detailed descriptions of these waveforms will be provided later.

Figure 4:
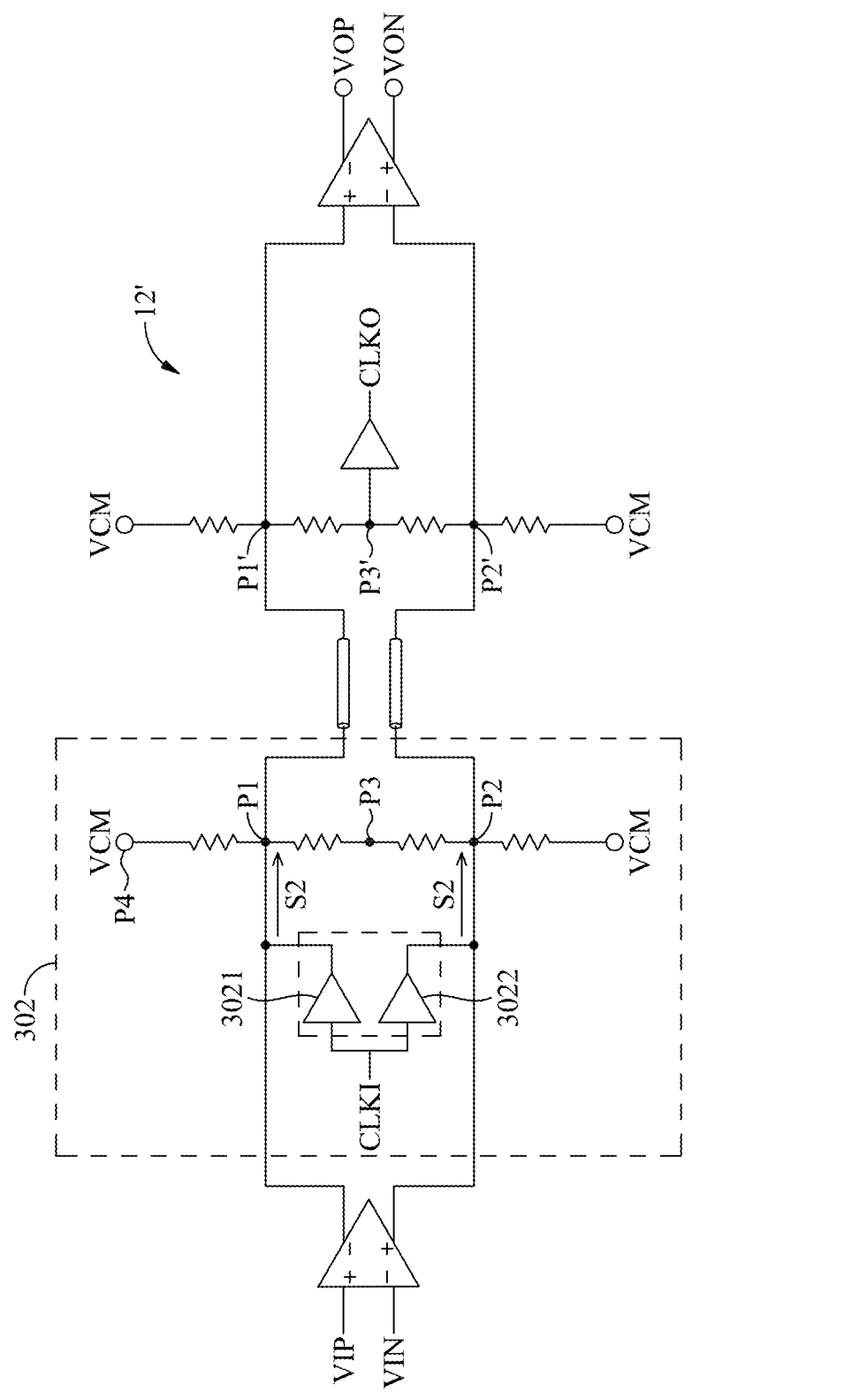
FIG. 4 illustrates a schematic diagram of a circuit structure in which a common-mode signal is fed through two terminals according to a preferred embodiment of the present disclosure.

In FIG. 2, the driver 1023 and 1023' for transmitting the clock signal CLKI are connected to the termination circuit 102 and 102' of the circuit structure 10 through the middle points P3, P3'. FIG. 4 shows another embodiment, and is a schematic diagram of the circuit structure 30 by feeding a common mode signal at two end points according to a preferred embodiment of the present disclosure. The drivers 3021, 3022 used for transmitting the clock signal CLKI are connected to the termination circuit 302 via the first point P1 and the second point P2, respectively. The receiving circuit 12' remains the same as depicted in FIG. 2. When the clock signal CLKI is transmitted from the point P3, it incurs energy consumption through the resistor. The driver 3021, 3022 for transmitting cock signal CLKI will be directly electrically connected to the first point P1 and the second point P2, respectively. The second signal S2 is directly fed into the first point P1 and the second point P2, and it can convey a higher amplitude (i.e., a larger swing) common mode signal.

In any embodiment of the present disclosure, the circuit structure 10, 20 are designed for simultaneously transmission of a first and a second data signals in the same or opposite direction within the same differential channel.

These circuit structures incorporate a receiving end that includes a CDR (Clock Data Recovery) circuit (not shown). The CDR circuit extracts the clock signal from the first data and/or the second data signals, and then uses this extracted clock to sample at least one of the first or second data signals.

In any embodiment of the present disclosure, it is possible for either the first differential signal or the first common mode signal to be a clock signal. In such cases, the circuit structure 10 and 20 include a clock receiving end that utilize this clock signal to sample the other signal, whether it is the first differential signal or the first common mode signal.

In any embodiment of the present disclosure, the common mode signal can be implemented as an NRZ (non-return to zero) signal or a PAM (pulse amplitude modulation) signal, with a preference for NRZ signaling. Similarly, the differential signal can be either an NRZ signal or a PAM signal, with a preference for PAM signaling.

Figure 5:
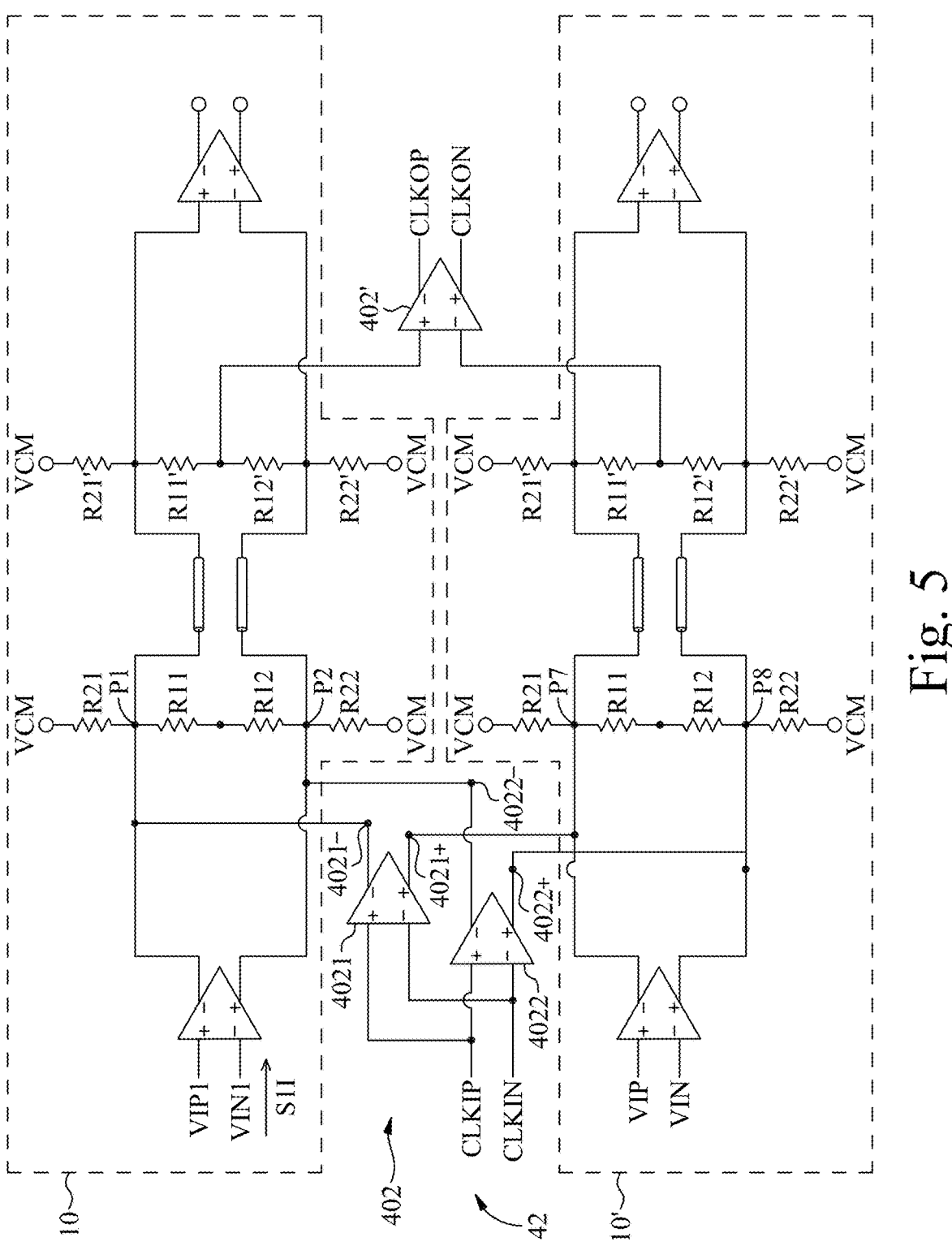
FIG. 5 illustrates a schematic diagram of a circuit structure with the circuit structure in FIGS. 3 and 4 combined together.

Please refer to FIG. 5, which illustrate a combination of the circuit structure 30 from FIG. 3 and the circuit structure 40 from FIG. 4. In this configuration, the clock signal CLKI depicted in FIG. 4 is replace by the differential clock signals CLKIP and CLKIN as shown in FIG. 3, which are transmitted by the drivers 4021 and 4022 respectively. Specifically, the output terminals 4021+, 4021− of the driver 4021 are connected to the endpoint P7 and the endpoint P1 respectively. Similarly, the output terminals 4022+, 4022− of the driver 4022 are connected to the endpoint P8 and the endpoint P2, respectively. This circuit structure 40 forms a set of differential common mode circuit structure 402 within the transmission circuit 42.

Figure 6:
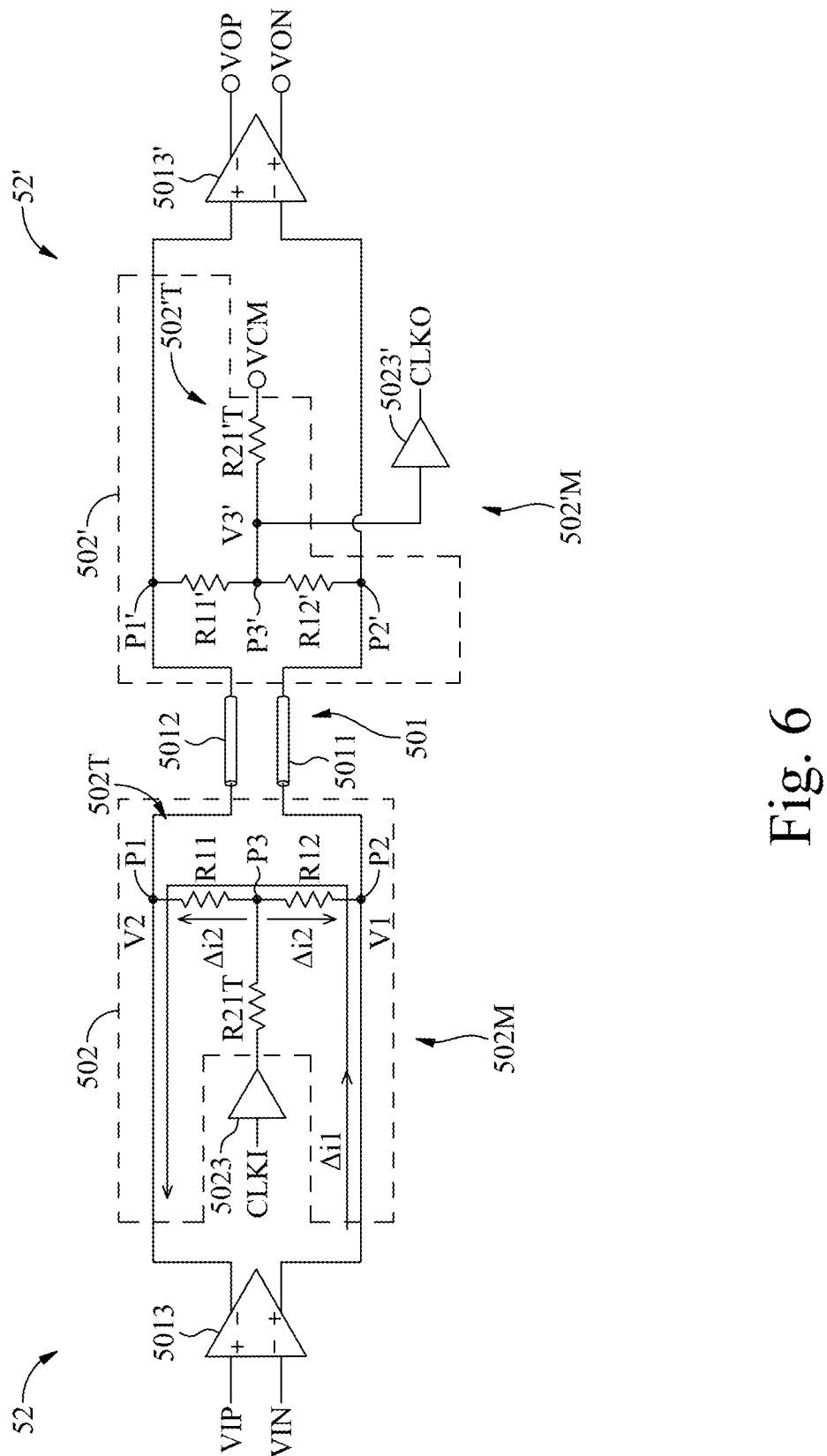
FIG. 6 illustrates a schematic diagram of a differential channel circuit structure of another termination circuit according to a preferred embodiment of the present disclosure.

Please refer to FIG. 6, which illustrates a schematic diagram of a differential channel circuit structure 50 featuring another terminal circuit in accordance with a preferred embodiment of the present disclosure. The differential channel circuit structure 50 includes a transmitting circuit 52 and a receiving circuit 52'. The transmitting circuit 52 comprises a termination circuit 502 and a driver 5013. The differential channel 501 includes transmission lines 5011, 5012, and is connected to both the driver 5013 and the terminal circuit 502. On the other hand, the receiving circuit 52' includes a terminal circuit 502' and a driver (or receiver) 5013', with the differential channel 501 being connected to the driver 5013' and the termination circuit 502'. In addition to these components, the transmitting circuit 52 also includes a driver 5023, while the receiving circuit 52' includes a receiver 5023'. The driver 5013 can be implemented as either a voltage driver or a current driver, preferably a current driver. Similarly, the driver 5023 can function as either a voltage driver or a current driver, preferably a voltage driver.

In FIG. 6, the termination circuits 502, 502' are impedance-matching termination circuits 502M, 502'M, and are T-type network terminal circuits 502T, 502'T, respectively. The T-typed network termination circuit 502T, 502'T includes a middle point P3, P3', a first first resistor R11 with the first resistance value R1, a first second resistor R12 with the first resistance value R1, and a second resistor R21 with a second resistance value R2. One end of the first first resistor R11, R11' and the first second resistor R12, R12' are connected to the middle point P3, P3' and one end of the second resistor R21, R21', and the other ends P1, P2, P1', P2' thereof are connected to the differential channel 501; that is, P1, P1' are connect to the transmission line 5012, and P2, P2' are connect to the transmission line 5011.

In any embodiment of the present invention, the first resistance value R1 of R11 and the first resistance value R1 of R12 are ideally equal. However, in practice, there may be deviations, but these deviations have a limited impact within a specific range. Similarly, the first resistance value R1 of R11' is ideally equal to the first resistance value R1 of R12', which are also limited within a specific range.

In FIG. 6, in the differential mode, the T-typed network termination circuit 502T ideally has an equivalent differential mode termination impedance that matches the differential mode impedance ZDIFF of the coupled transmission lines 5011, 5012, and it is known that the differential mode impedance of the transmission line 5011, 5012 is ZDIFF=2ZODD according to Equation 15. In the differential mode, the driver 5013 in the transmission circuit 52 is preferably a current driver. The currents flowing through R11 and R12 cancel each other out, allowing the middle point P3 to be treated as a virtual ground. The differential current Δi1 flows from the positive output terminal of the driver 5013, passes through terminals P2, P3, P1 in sequence, and then returns to the negative output terminal of the driver 5013. The differential mode impedance ZDIFF=R1+R1=2R1=2ZODD, resulting in R1=ZODD (Equation 21).

In FIG. 6, in the common mode, the equivalent common mode termination impedance of the T-type terminal circuit 502T is equal to the common mode impedance ZCOMM of the coupling transmission line 5011, 5012. According to Equation 16, the common mode impedance of the transmission line 5011, 5012 is ZCOMM=(½)×ZEVEN. In the common mode, the driver 5023 in the transmission circuit 52 is preferably a voltage driver. The current flowing through the second resistor R21 flows through the first first resistor R11 and the first second resistor R12 respectively, creating the same voltage at the endpoint P1 and P2, and thus the common mode impedance ZCOMM=R2+(R1‖R1). By substituting R1=ZODD into the equation above, we get $$ZCOMM = \qquad\qquad\qquad\qquad\qquad\text{(Equation 22)}$$
$$R2 + (\ ZODD\|ZODD) = R2 + \frac{1}{2}\ ZODD = \frac{1}{2}\ ZEVEN.$$

According to Equations 12 and 10, $$Z_{EVEN} = \sqrt{\frac{L_{11} + L_{12}}{C_{11}}} \quad \text{and}$$

$$Z_{ODD} = \sqrt{\frac{L_{11} - L_{12}}{C_{11} + 2 \cdot C_{12}}},$$

and these electrical parameters of C11, C12, L11, L12 are related to the size and spacing of the transmission line 5011, 5012, and the dielectric constant of the dielectric material. Therefore, by properly designing the size and spacing, and the dielectric constant of the dielectric material, the value of the first resistor R1 and the second resistor value R2 can be determined, ensuring that the impedance of the transmission line 5011, 5012 matches the impedance of the termination circuit 102.

Similar to the π-type network terminal circuit 102π, the voltage V1 at the endpoint P2 of T-type network terminal circuit 102T is influenced by the variations in small signal current Δi1 and Δi2; that is, the voltage V1 can be expressed as a function of the small signal current Δi1 and Δi2, expressed as V1 (Δi1, Δi2). Similarly, the voltage V2 at the endpoint P1 is also influenced by the variations in small signal current $\Delta i1$ and $\Delta i2$; that is, the voltage V2 can be represents as a function of the small signal current $\Delta i1$ and $\Delta i2$, expressed as V2 ($\Delta i1$, $\Delta i2$). These small signal currents $\Delta i1$ and $\Delta i2$ are influenced by the differential signals VIP, VIN and the clock signal CLKI, respectively.

In FIG. 6, the T-type network terminal circuit 502'T in the receiving circuit 52' is identical to the T-type network terminal circuit 502T circuit in the transmission circuit 52, so is the resistor values are also the same: R1=ZODD, R2=½(ZEVEN–ZODD). A common mode bias voltage VCM (or an ac ground) is applied to one end of the second resistor R21', and the other end of the second resistor R21' is connected to the middle point P3'. The common mode signal voltage can be extracted from the middle point P3', i.e. the voltage V3' of the voltage division at the point P1', P2', and the divided voltage V3' is then input to the receiver 5023' to generate the clock signal CLKO.

Figure 7:
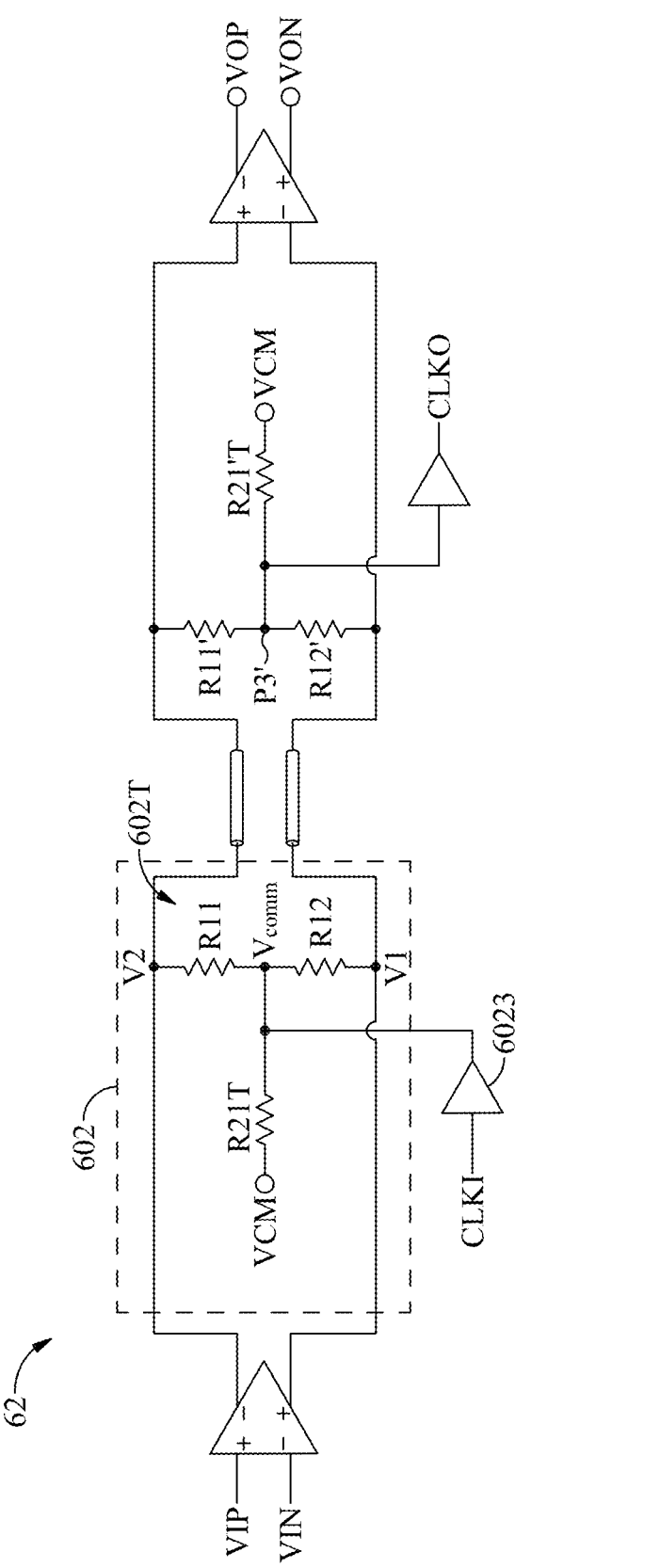
FIG. 7 illustrates a schematic diagram of a differential channel circuit structure of another termination circuit according to a preferred embodiment of the present disclosure.

Please refer to FIG. 7, which illustrate a schematic diagram of a differential channel circuit structure 60 for another termination circuit according to a preferred embodiment of the present disclosure. The differential channel circuit structure 60 shares similarities with the differential channel circuit structure 50 in FIG. 6. The key difference lies in the driver 6023 of T-type network termination circuit 602T in the transmitting circuit 62, which has been changed from a voltage driver to a current driver. In this configuration, the common mode bias signal VCM is provided to the second resistor R21T of the T-typed network termination circuit 602T. The second input signal, which is the clock signal CLKI, is input to the driver 6023, generating a common mode signal VCOMM. This common mode signal VCOMM represents the divided voltage or average value of the voltages V1 and V2, that is, VCOMM=(½)×(V1+V2). The termination circuits are all T-typed network termination circuits, so R1=ZODD and R2=(½)×(ZEVEN–ZODD) similarly.

Figure 8:
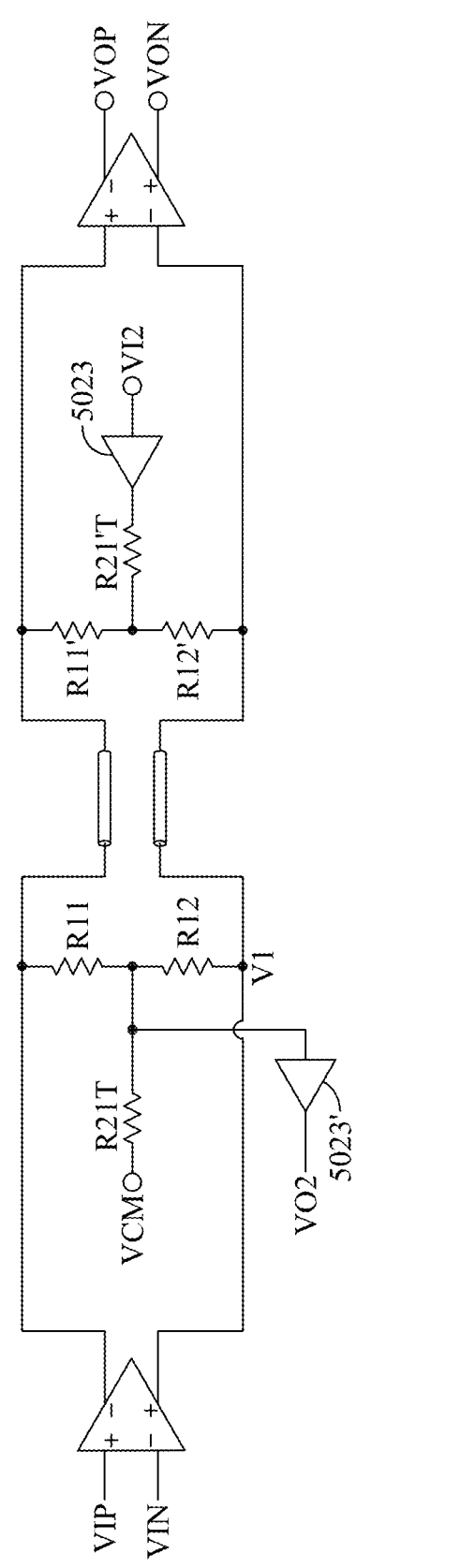
FIG. 8 illustrates a schematic diagram of a differential channel circuit structure of another termination circuit according to a preferred embodiment of the present disclosure.

Please refer to FIG. 8, which depicts a schematic diagram of a differential channel circuit structure 70 for another termination circuit according to a preferred embodiment of the present disclosure. The differential channel circuit structure 70 is similar to the differential channel circuit structure 50 in FIG. 6, with a few differences. Firstly, the driver 5023 in the transmission circuit 52 has been replaced with a receiver 5023', and the connection method of the receiver 5023' remains the same as depicted in FIG. 6. Conversely, the receiver 5023' in the receiving circuit 52' has been replaced with a driver 5023, and the connection of the driver 5023 is identical to that shown in FIG. 6. Furthermore, in FIG. 8, the transmitting direction of the differential signal VIP and VIN is opposite to that of the input signal associated with the common mode. The input signal can encompass not only the clock signal CLKI, which carries the clock information, but also the voltage signal VI2, which carries data. The termination circuits are all T-typed network termination circuits, so R1=ZODD and R2=(½)×(ZEVEN–ZODD) similarly.

Figure 9:
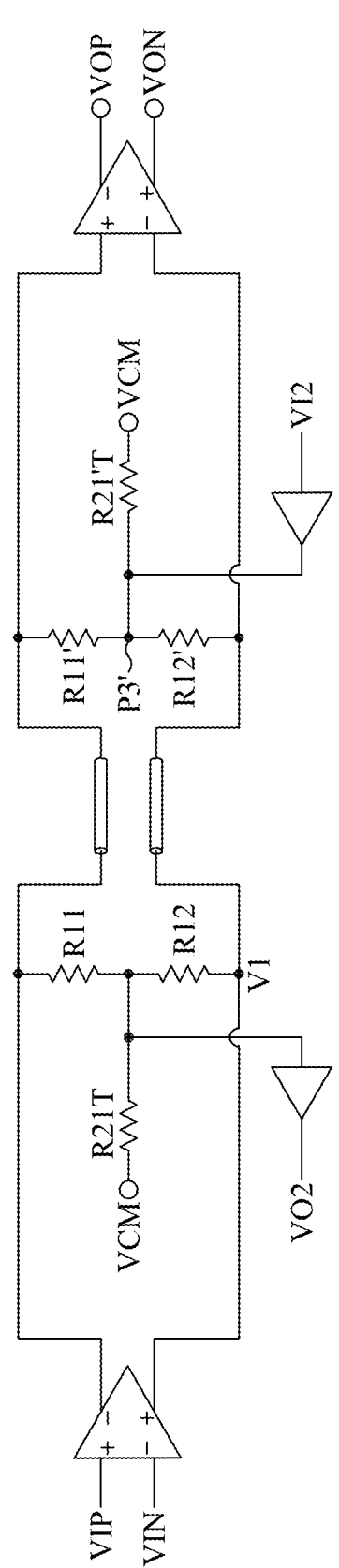
FIG. 9 illustrates a schematic diagram of a differential channel circuit structure of another termination circuit according to a preferred embodiment of the present disclosure.

Please refer to FIG. 9, which illustrates a schematic diagram of a differential channel circuit structure 80 for another termination circuit according to a preferred embodiment of the present disclosure. The differential channel circuit structure 80 is similar to the differential channel circuit structure 60 shown in FIG. 7. However, there is a difference in the transmitting direction of the differential signal VIP, VIN, which is opposite to that of the input signal associated with the common mode. Similar to previous configurations, the input signal can include not only the clock signal CLKI, which carries the clock information, but also the voltage signal VI2, which carries data. The termination circuits are all T-typed network termination circuits, so similarly R1=ZODD and R2=(½)×(ZEVEN–ZODD).

Figure 10:
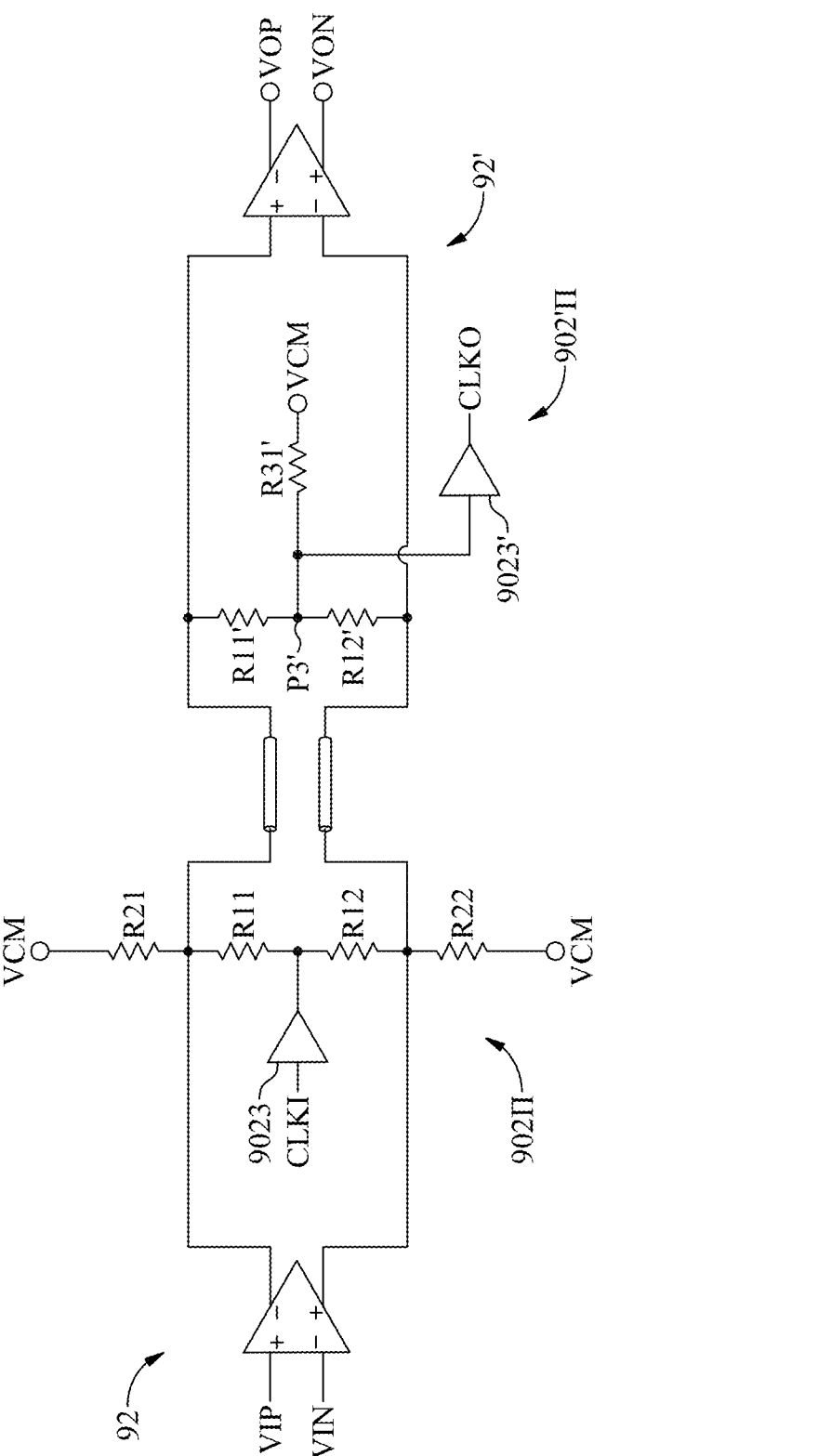
FIG. 10 illustrates a schematic diagram of a differential channel circuit structure of a hybrid termination circuit according to a preferred embodiment of the present disclosure.
Figure 11:
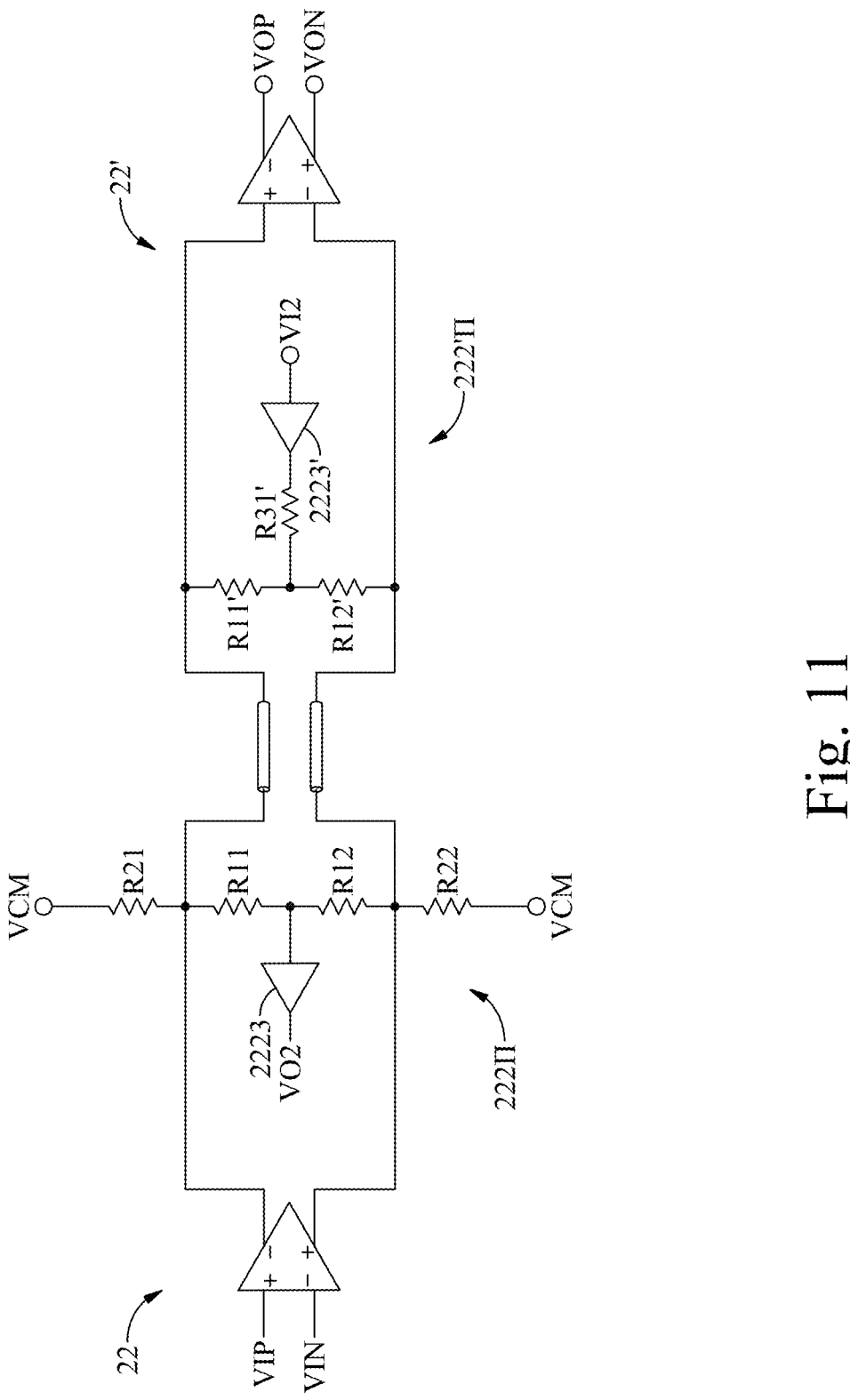
FIG. 11 illustrates a schematic diagram of a differential channel circuit structure of another hybrid termination circuit according to a preferred embodiment of the present disclosure.

Please refer to FIG. 10, which represents a schematic diagram of a differential channel circuit structure 90 for a hybrid termination circuit according to a preferred embodiment of the present disclosure. The transmission circuit 92 in the differential channel circuit structure 90 can be a $\pi$-type network termination circuit 902$\pi$, while the receiving circuit 92' can be a T-type network termination circuit 902'T. In the transmission circuit 902$\pi$, the driver 9023 is preferably a current driver. However, in another embodiment, a voltage driver 2223' can be utilized, as shown in FIG. 11. For the impedance-matching relationship of the $\pi$-type network termination circuit 902$\pi$ in the transmission circuit 92, reference can be made to Equations 18-19. In these equations, R2=ZEVEN, and R1=$(Z_{EVEN} \times Z_{ODD})/(Z_{EVEN}-Z_{ODD})$. Regarding the impedance-matching relation of the T-type network termination circuit 902'T in the receiving circuit 92', the equations 21-22 can be consulted. In these equations, $$R1' = ZODD, R3 = \frac{1}{2} \ (ZEVEN - ZODD).$$

Please refer to FIG. 11, which depicts a schematic diagram of a differential channel circuit structure 21 for another hybrid termination circuit according to a preferred embodiment of the present disclosure. The differential channel circuit structure 21 is similar to the differential channel circuit structure 90 shown in FIG. 10. However, there are a few notable differences therebetween. Firstly, the transmitting direction of the differential signal VIP, VIN is opposite to that of input signal VI2, which can be a data signal or a clock signal. Secondly, the driver 2223 of the $\pi$-type network termination circuit 222$\pi$ is a receiver, which outputs an output signal VO2. Thirdly, the driver 2223' of the T-type network termination circuit 222'T in the receiving circuit 22' is preferably a voltage driver. The impedance-matching relationship of the $\pi$-type network termination circuit 222$\pi$ in the transmission circuit 22 can be determined using Equations 18-19, R2=ZEVEN, and R1=$(Z_{EVEN} \times Z_{ODD})/(Z_{EVEN}-Z_{ODD})$. Similarly, the impedance-matching relation of the T-type network termination circuit 222'T in the receiving circuit 22' can be determined using Equations 21-22, $$R1' = ZODD, R3 = \frac{1}{2} \ (ZEVEN - ZODD).$$

In the case of the input signal VI2, the receiving circuit 22' is regarded as a transmitting circuit, while the transmitting circuit 22 is regarded as a receiving circuit.

Figure 12:
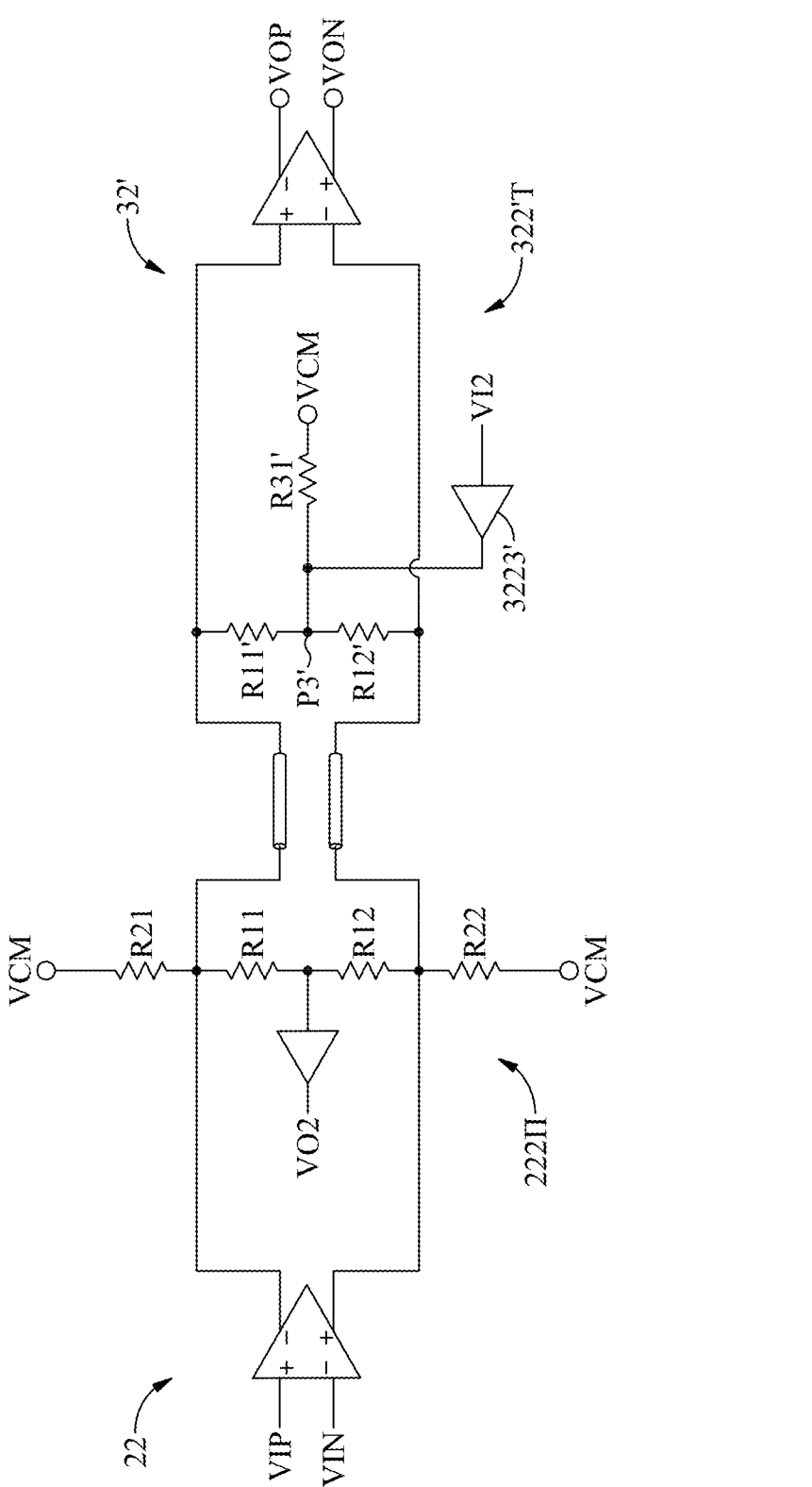
FIG. 12 illustrates a schematic diagram of a differential channel circuit structure of another hybrid termination circuit according to a preferred embodiment of the present disclosure.

Please refer to FIG. 12, which illustrates a schematic diagram of a differential channel circuit structure 31 for another hybrid termination circuit according to a preferred embodiment of the present disclosure. The differential channel circuit structure 31 is similar to FIG. 11. However, there is a difference in the driver 3223' of the T-type network termination circuit 322'T in the transmission circuit 32'. In this case, the driver 3223' function as a current driver. For the impedance-matching relationship of the $\pi$-type network termination circuit 222$\pi$, you can refer to Equations 18-19, R2=ZEVEN, and R1=$(Z_{EVEN} \times Z_{ODD})/(Z_{EVEN}-Z_{ODD})$. Similarly, for the impedance-matching relationship of the T-type network termination circuit 222′T can refer to Equations 21-22, $$R1' = ZODD, \quad R3 = \frac{1}{2} \ (ZEVEN - ZODD).$$

Figure 13:
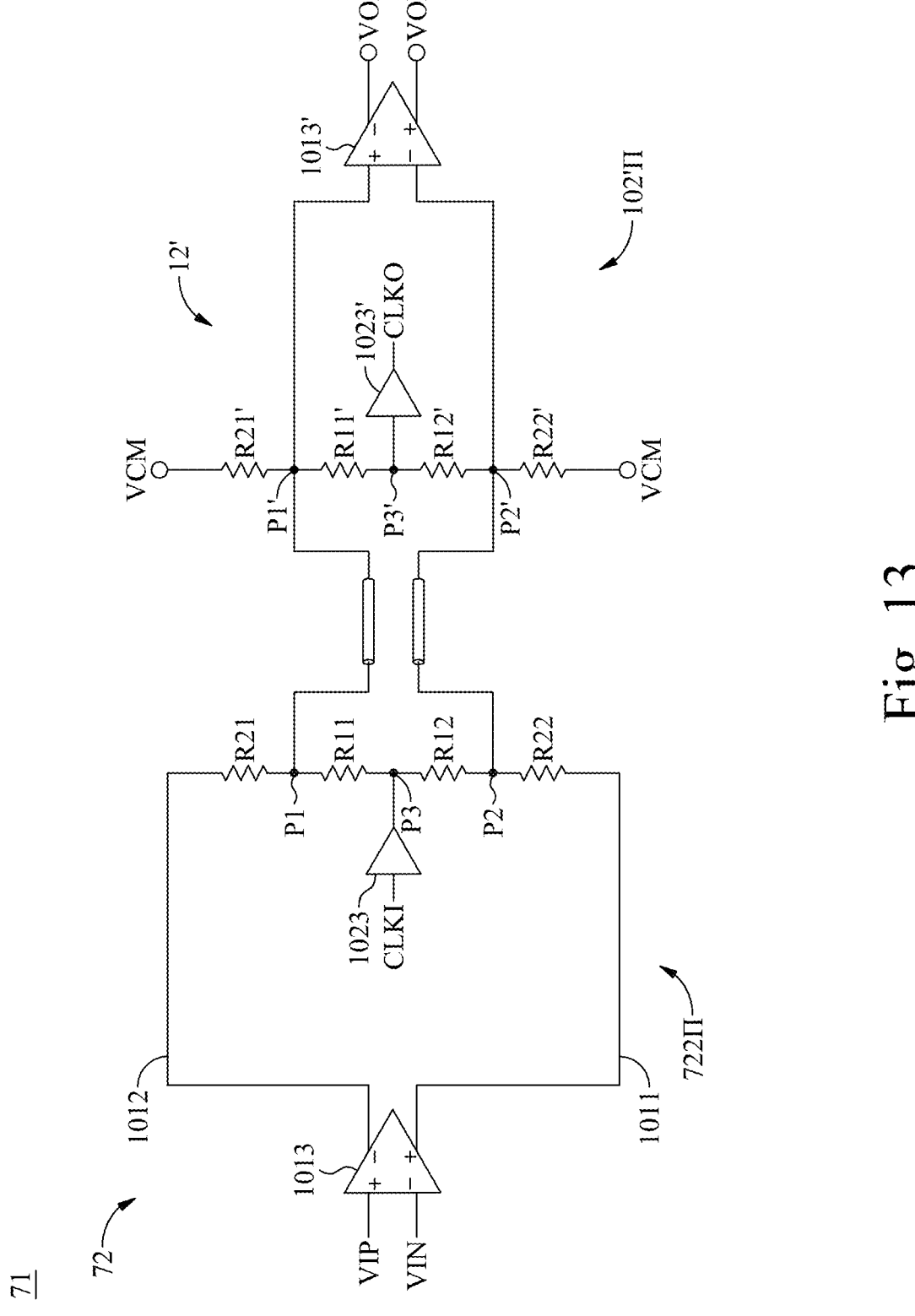
FIG. 13 illustrates a schematic diagram of a differential channel circuit structure of different termination circuits in a preferred embodiment of the present disclosure.

Please refer to FIG. 13, which illustrates a schematic diagram of a differential channel circuit structure 71 for different termination circuits in a preferred embodiment of the present disclosure. The differential channel circuit structure 71 is similar to the differential channel circuit structure 10 in FIG. 2. However, there is a difference is that one end of the second first resistor R21 is directly connected to the negative output end of the driver 1013, while the other end is connected to the first first resistor R11 and the coupled transmission line. Similarly, one end of the second second resistor R22 is directly connected to the positive output end of the driver 1013, and the other end is connected to the first second resistor R12 and the coupled transmission line. Importantly, the π-type network termination circuit 722π in the transmission circuit 72 does not require a common mode bias voltage VCM. Instead, the driver 1013 can directly supply the current carrying the differential signals VIP and VIN to the π-type network termination circuit 722π. The impedance-matching relationship between the π-type network termination circuit 722π in the transmitting circuit 72 and the π-type network termination circuit 102′π in the receiving circuit 12′ is also R1=($Z_{EVEN}$×$Z_{ODD}$)/($Z_{EVEN}$−$Z_{ODD}$), and R2=ZEVEN. In this embodiment, it is preferable for the driver 1013 to be a voltage driver, while the driver 1023 is preferably a current driver.

Figure 14A:
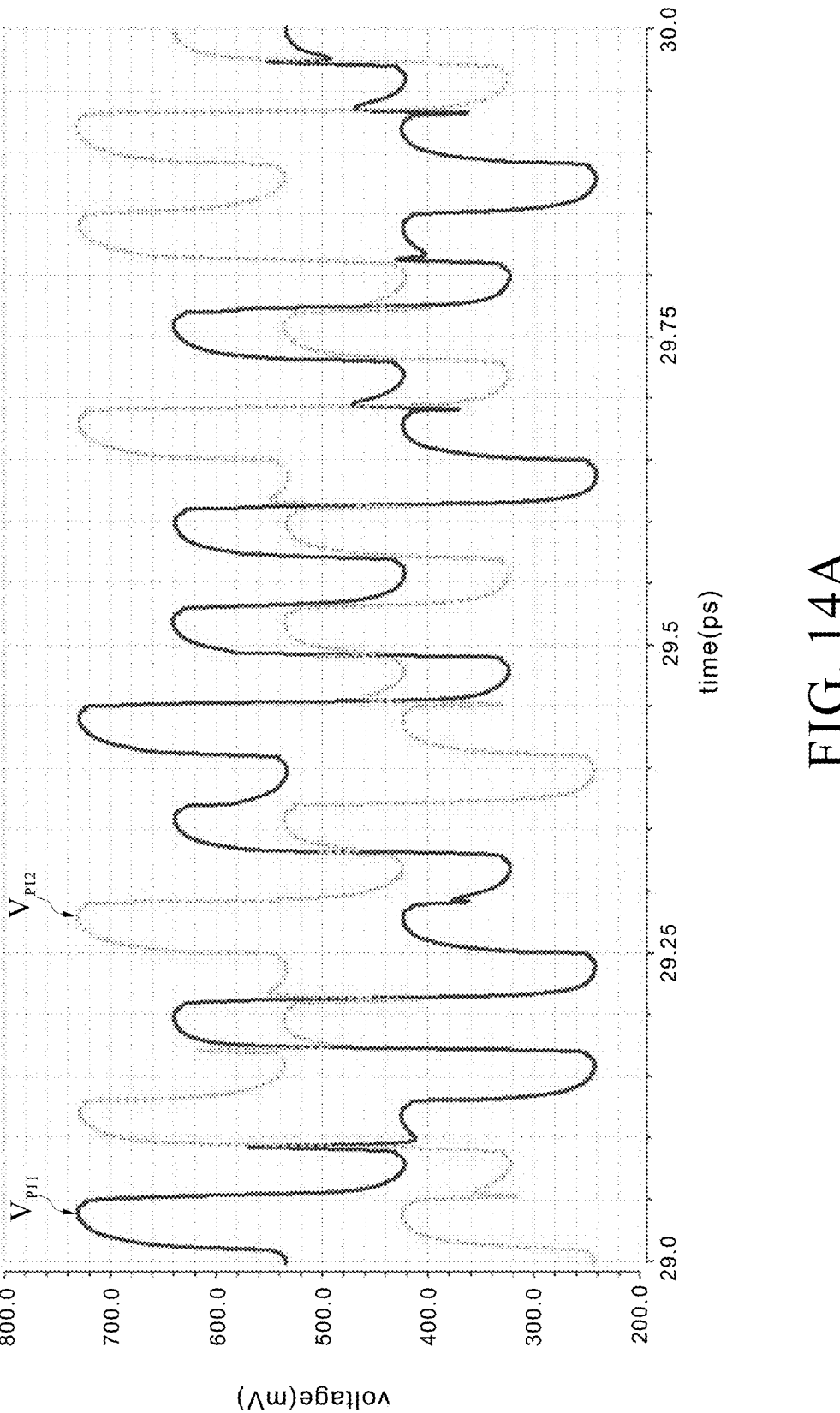
FIG. 14A illustrates a schematic waveform diagram of the input (transmission) terminal of the termination circuit in FIG. 3 according to a preferred embodiment of the present disclosure.

Please refer to FIG. 14A, which illustrates waveforms of the input (transmission) endpoints PI1 and PI2 of the termination circuit of the schematic diagram in FIG. 3 according to a preferred embodiment of the present disclosure. The horizontal axis represents time in picoseconds (ps), and the vertical axis represents voltage in millivolts (mV). In one embodiment, the differential signals VIP1, VIN1, VIP2, and VIN2 carrying data in FIG. 3 are utilized for data transmission using pulse amplitude modulation (PAM) method. These signals are divided into different potentials, such as four levels (represented by PAM-4), allowing the transmission of two binary bits or one quaternary bit of data. Furthermore, in one embodiment, the differential signals CLKIP, CLKIN, CLKOP, and CLKON carrying the clock in FIG. 3 are non-return-to-zero (NRZ) signals, which can be classified into two different potentials.

Figure 14B:
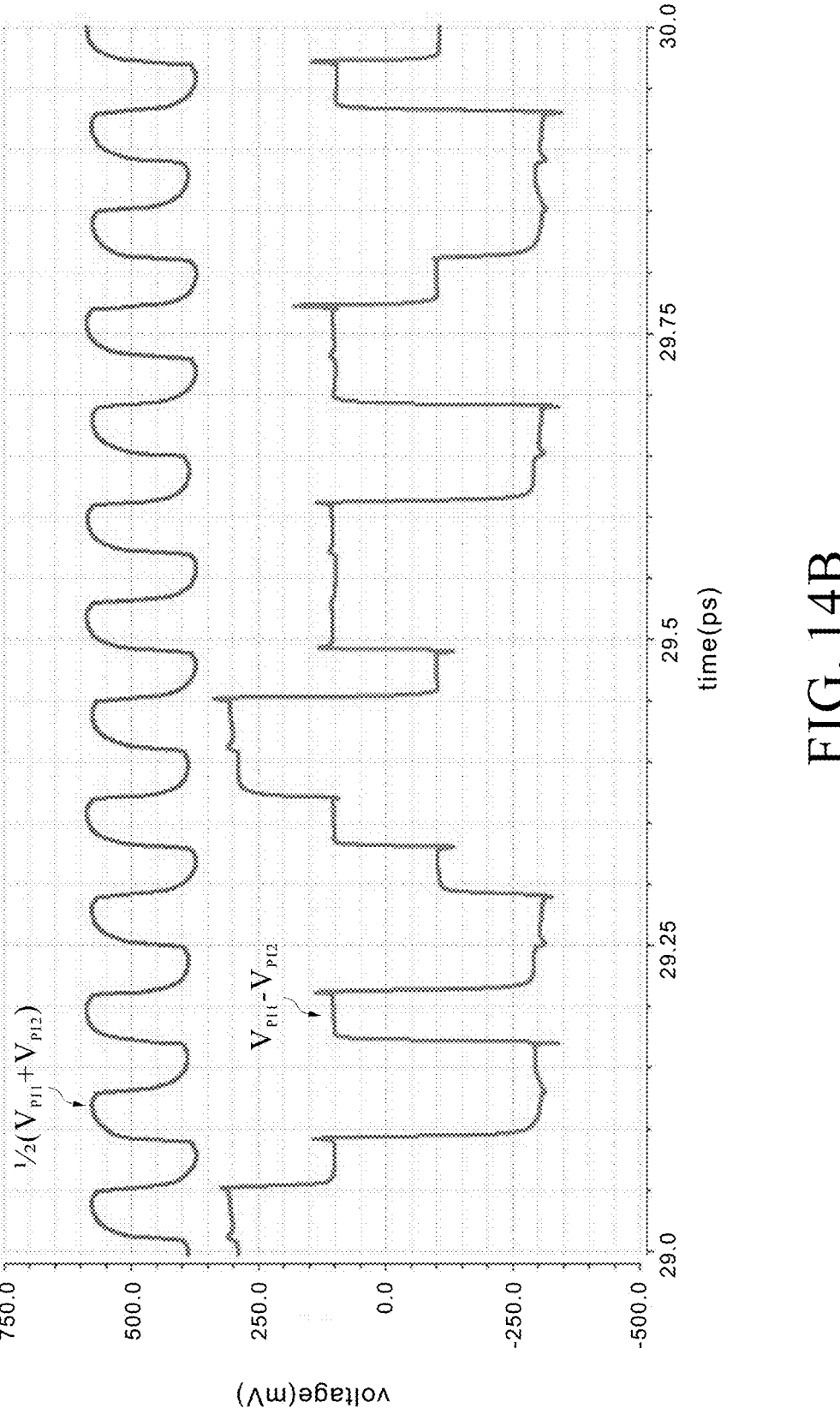
FIG. 14B illustrates a schematic waveform diagram of the differential and common mode signals at the input (transmission) terminal of the termination circuit in FIG. 3 according to a preferred embodiment of the present disclosure.

Please refer to FIG. 14B, which illustrates a schematic waveform diagram of the differential and common mode signals at the input (transmission) ends PI1, PI2 of the termination circuit in FIG. 3 according to a preferred embodiment of the present disclosure. To better understand the relationship, please refer to FIGS. 3 and 14B simultaneously. The voltages at the transmission endpoints PI1 and PI2 are denoted as VPI1 and VPI2, respectively. The differential signal between the transmission endpoints PI1 and PI2 is represent as VPI1−VPI2, while the common mode signal is (½)×(VPI1+VPI2). Taking FIG. 14B as an example, we can observe that the amplitude (or swing) of the differential signal VPI1−VPI2 ranges between approximately plus or minus 250 mV. It exhibits four distinct potentials and ideally does not affect the operation of the common mode signal (½)×(VPI1+VPI2) within the same differential channel. On the contrary, in an ideal scenario, the common mode signal should not affect the differential signal either.

Figure 14C:
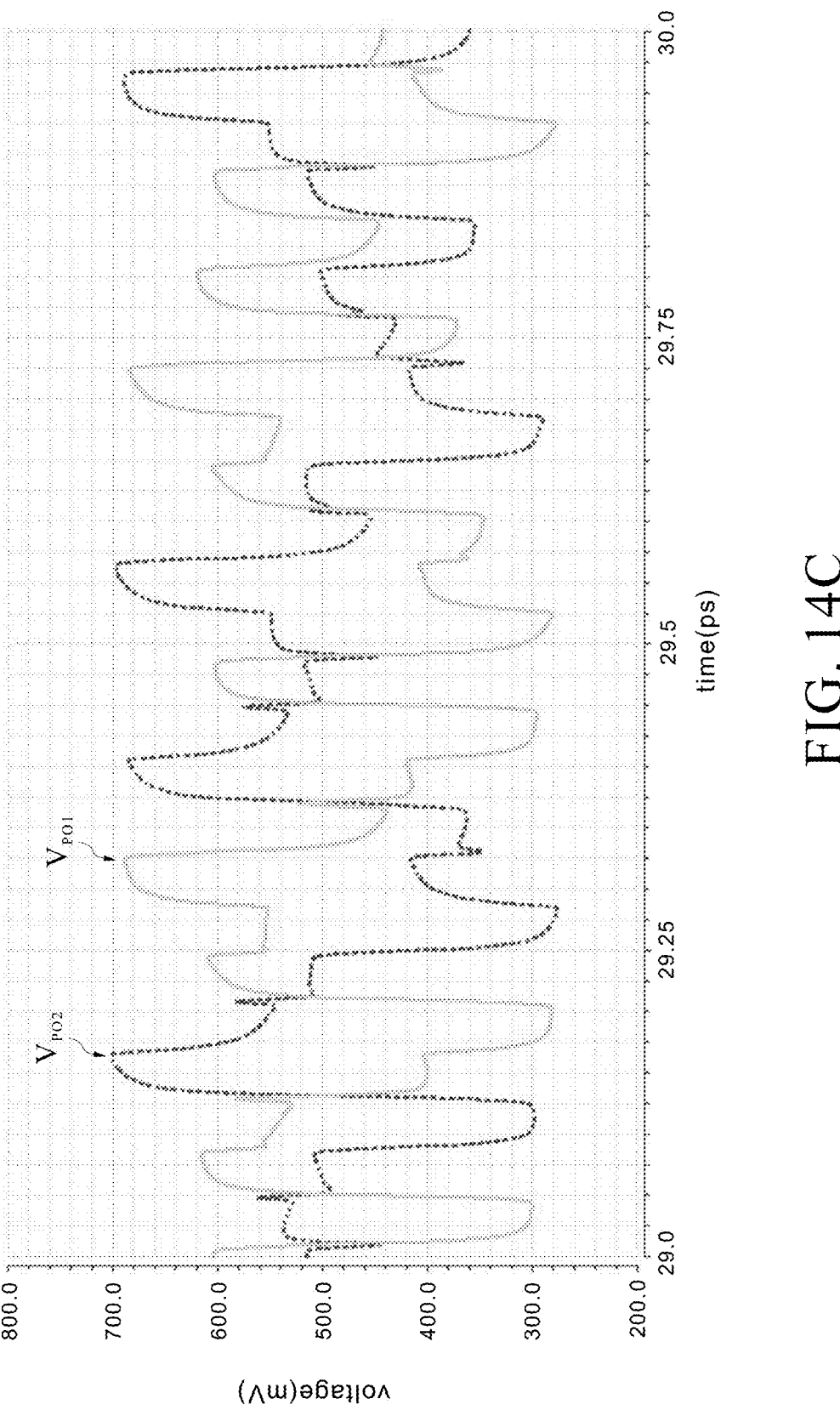
FIG. 14C illustrates a schematic waveform diagram of the output (receiving) terminal of the termination circuit in FIG. 3 according to a preferred embodiment of the present disclosure.

Please refer to FIG. 14C, which illustrates a schematic waveform diagram of the receiving endpoints PO1 and PO2 of the terminal circuit in FIG. 3 according to a preferred embodiment of the present disclosure. To gain a comprehensive understanding, please refer to FIGS. 3 and 14C. The voltages at the receiving endpoints PO1 and PO2 are denoted as $V_{PO1}$ and $V_{PO2}$, respectively. In one embodiment, the waveforms observed at the receiving endpoints PO1 and PO2 represent the transmitted waveforms of the differential signals VIP1 and VIN1 carrying data, along with the common mode signal CLKIP after the transmission.

Figure 14D:
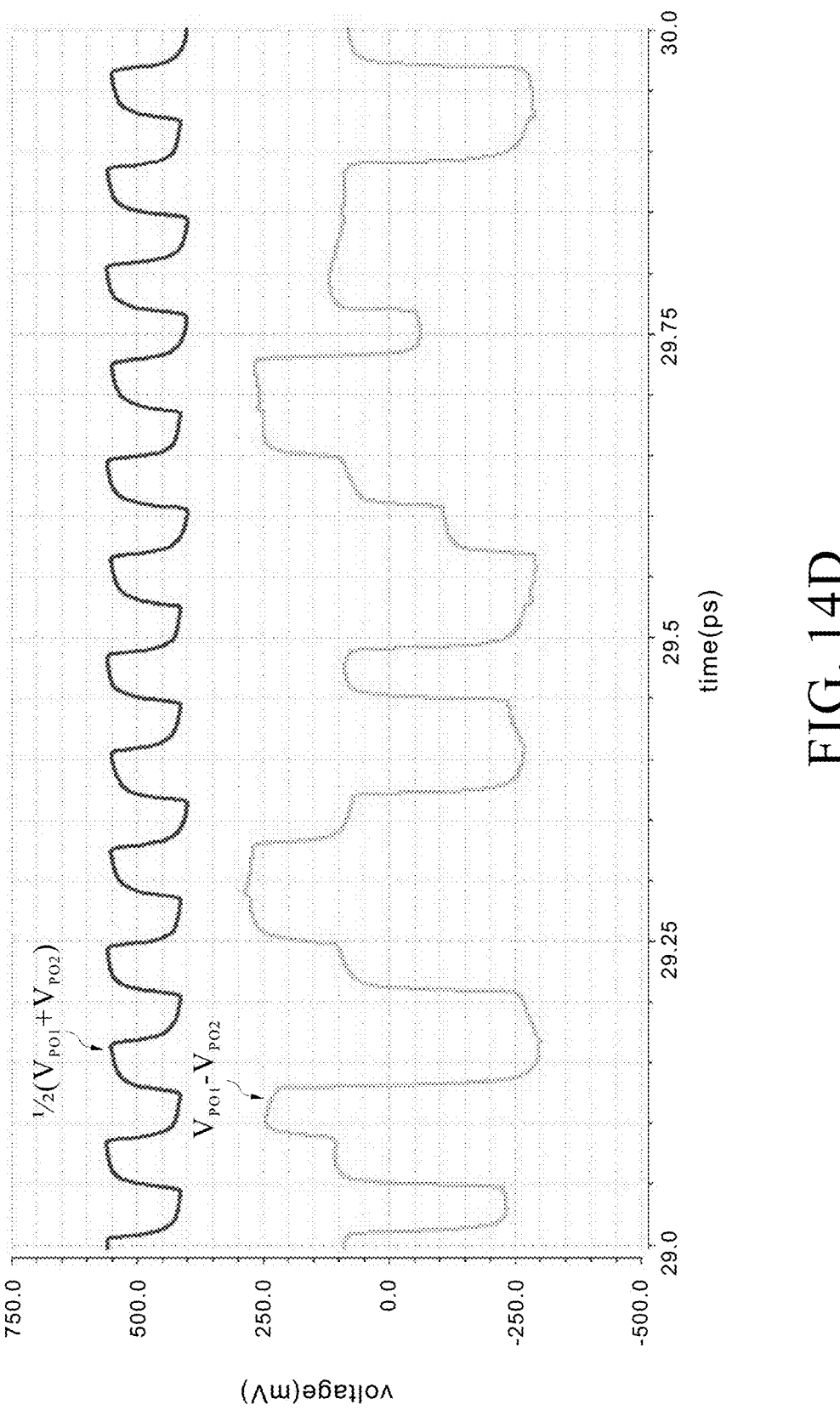
FIG. 14D illustrates a schematic waveform diagram of the differential and common mode signals at the output (receiving) termination of the terminal circuit in FIG. 3 according to a preferred embodiment of the present disclosure.

Please refer to FIG. 14D, which illustrates a schematic waveform diagram of the differential and common mode signals of the receiving endpoints PO1 and PO2 of the termination circuit in FIG. 3 according to a preferred embodiment of the present disclosure. To better understand the relationship, please consult FIGS. 3 and 14D. The voltages at the receiving endpoints PO1 and PO2 are represented as VPO1 and VPO2, respectively. The differential signal between the receiving endpoints PO1 and PO2 is denoted as VPO1-VPO2, while the common mode signal is (½)×(VPO1+VPO2). According to FIG. 14D, we can observe that the amplitude (or swing) of the differential signal VPO1-VPO2 encompasses four distinct potentials. Ideally, this differential signal should not adversely affect the operation of the common mode signal (½)×(VPO1+VPO2) within the same differential channel. On the contrary, in an ideal scenario, the common-mode signal should not affect the differential signal either.

Figure 14E:
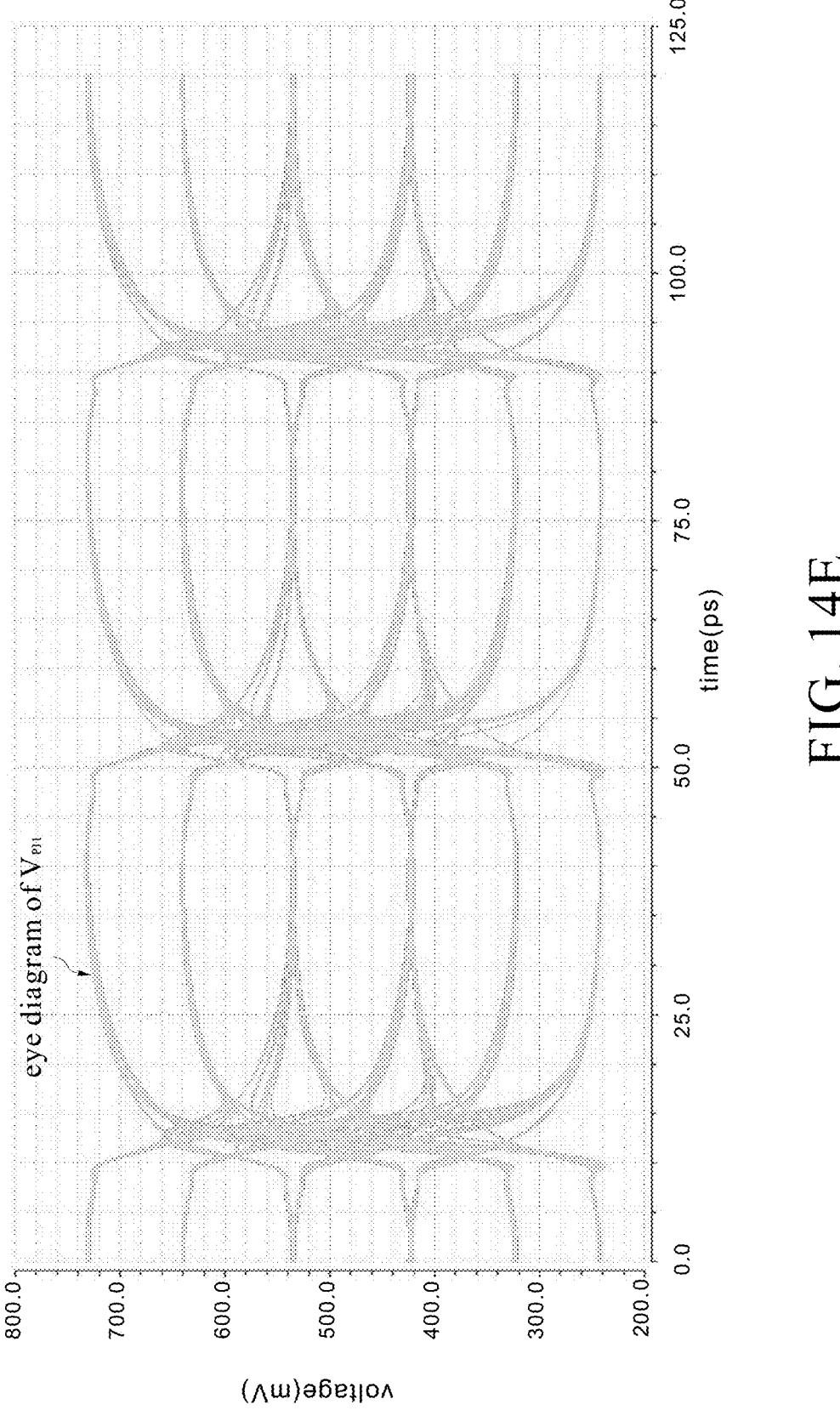
FIG. 14E illustrates a schematic diagram of the eye diagram of the voltage of the transmission terminal in FIG. 3 according to a preferred embodiment of the present disclosure.

Please refer to FIG. 14E, which illustrates an eye diagram of the voltage VPI1 of the transmitting endpoint PI1 of the schematic diagram in FIG. 3, according to a preferred embodiment of the present disclosure.

Figure 14F:
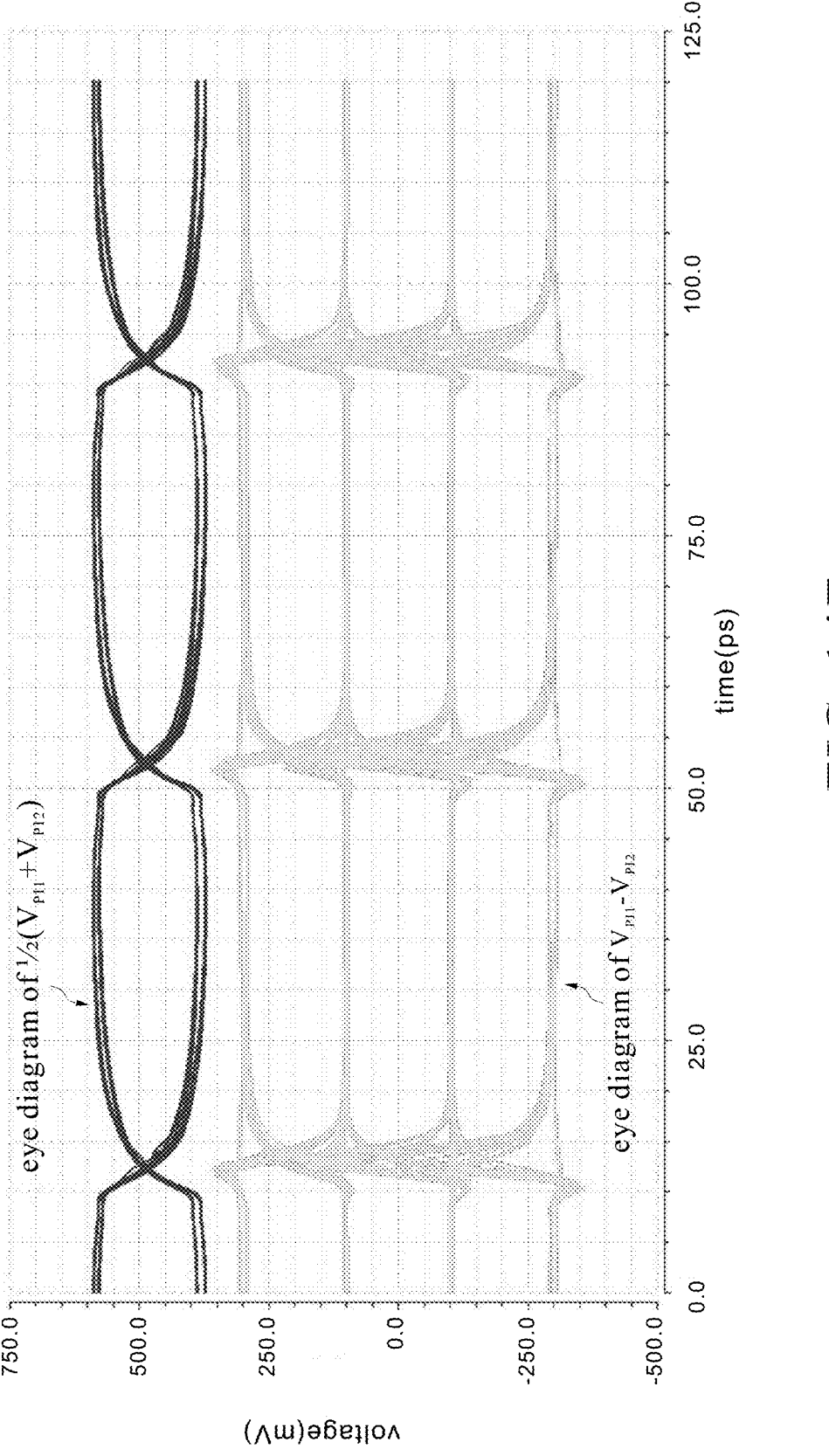
FIG. 14F illustrates a schematic diagram of the eye diagram of the differential signal and the common mode signal at the transmitting terminal in FIG. 3 according to a preferred embodiment of the present disclosure.

Please refer to FIG. 14F, which illustrates an eye diagram of the differential and common mode signals of the transmission endpoints PI1, PI2 of the schematic diagram in FIG. 3 according to a preferred embodiment of the present disclosure. In this eye diagram, the differential signals VPI1–VPI2 exhibit an eye-opening degree of approximately 150 mV for each distinct potential. In one embodiment, the common mode signal (½)×(VPI1+VPI2) in the eye diagram of displays an eye-opening degree of around 150 mV.

Figure 14G:
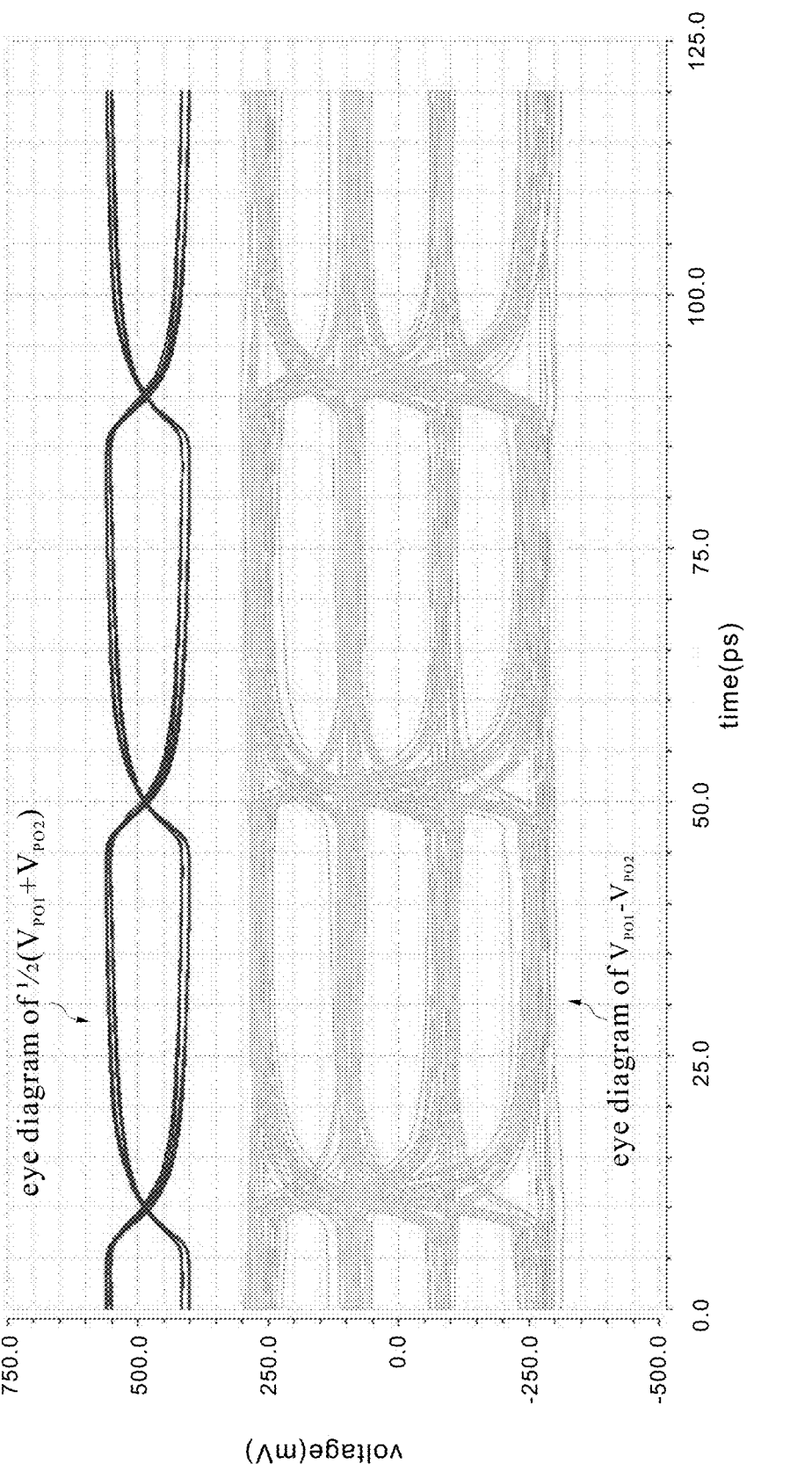
FIG. 14G illustrates a schematic diagram of the eye diagram of the differential signal and the common mode signal at the receiving terminal in FIG. 3 according to a preferred embodiment of the present disclosure.

Please refer to FIG. 14G, which illustrates the eye diagram of the differential and common mode signals of the receiving endpoints PO1 and PO2 of the schematic diagram in FIG. 3 according to a preferred embodiment of the present disclosure. In this eye diagram, the eye-opening degree of the differential signal $V_{PO1}$−$V_{PO2}$ for each potential is slightly lower than 150 mV, compared to the eye-opening degree at the transmission endpoints PI1 and PI2. Similarly, the eye-opening degree of the common mode signal (½)× (VPO1+VPO2) in the eye diagram is also less than 150 mV.

Figure 15A:
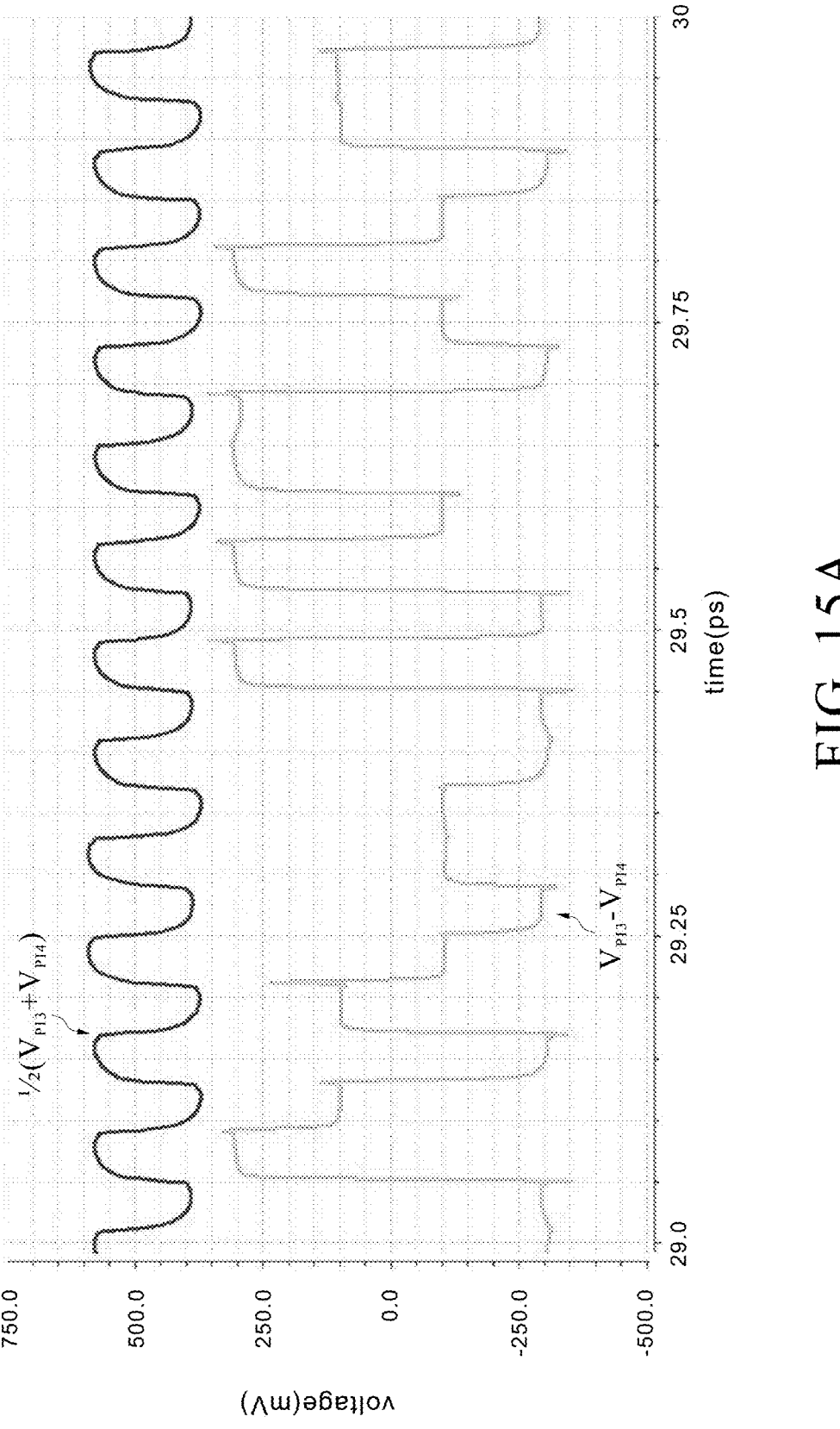
FIG. 15A illustrates a schematic waveform diagram of the differential and common mode signals at the input (transmission) terminal of the termination circuit in FIG. 3 according to a preferred embodiment of the present disclosure.

Please refer to FIG. 15A, which illustrates a schematic waveform diagram of the differential and common mode signals of the transmission endpoints PI3 and PI4 of the termination circuit in FIG. 3 according to a preferred embodiment of the present disclosure. To better understand the relationship, please refer to FIGS. 3 and 15A. The voltages at the transmission endpoints PI3 and PI4 are denoted as VPI3 and VPI4, respectively. The differential signal between the transmission terminals PI3 and PI4 is VPI3–VPI4, and the common mode signal is

21

$$\frac{1}{2}(VPI3 + VPI4).$$

Taking FIG. 15A as an example, we can observe that the amplitude (or swing) of the differential signal VPI3–VP14 ranges between approximately plus or minus 250 mV. It exhibits four distinct potentials, and ideally does not affect the operation of the common mode signal $$\frac{1}{2}(VPI3 + VPI4)$$

within the same differential channel. On the contrary, in an ideal scenario, the common mode signal should not affect the differential signal either.

Figure 15B:
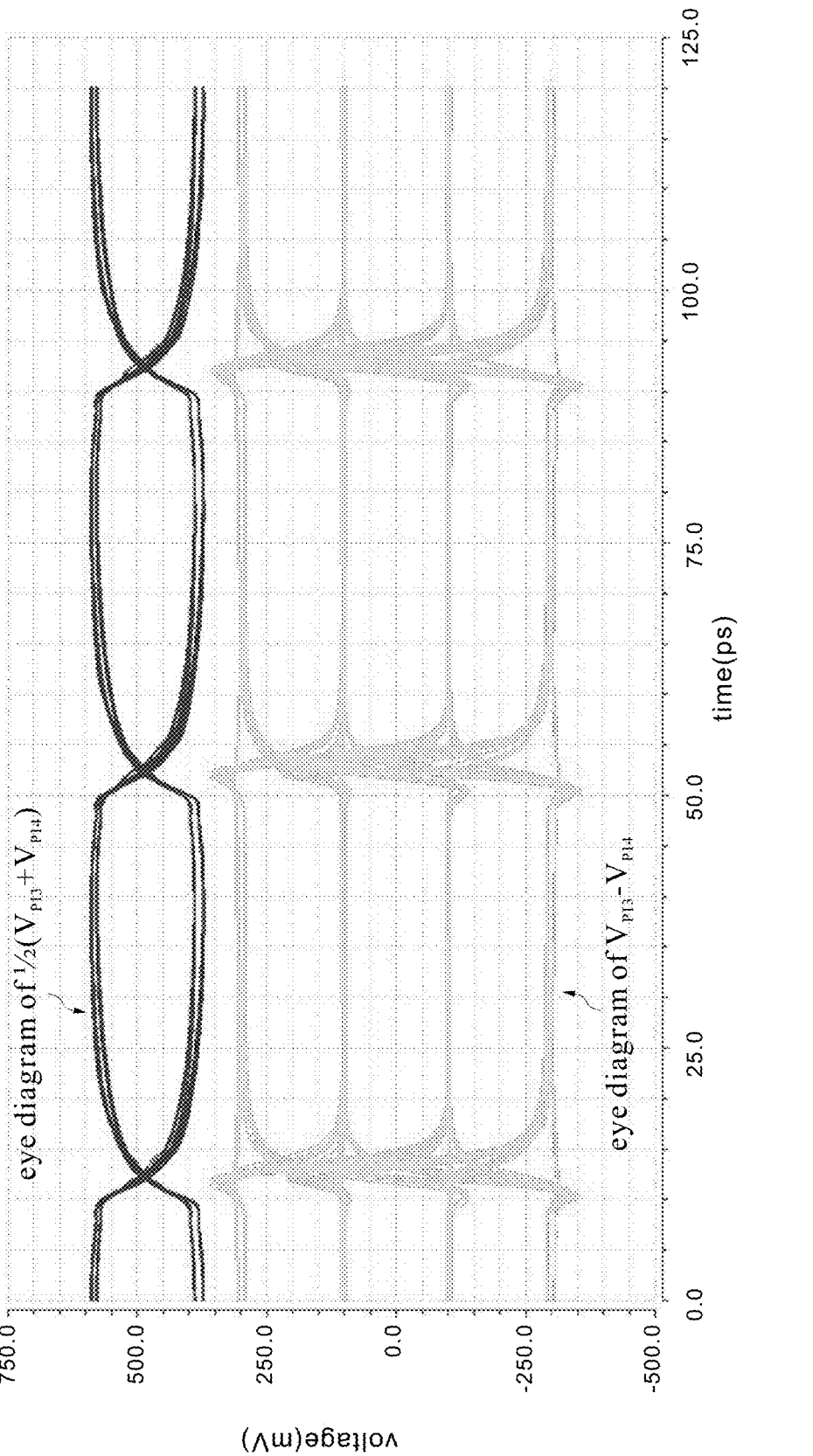
FIG. 15B illustrates a schematic diagram showing the eye diagram of the differential signal and the common mode signal at the transmitting terminal in FIG. 3 according to a preferred embodiment of the present disclosure.

Please refer to FIG. 15B, which illustrates a schematic waveform diagram of the eye diagram of the differential signal and the common mode signal of the transmission endpoints PI3 and PI4 in FIG. 3 according to a preferred embodiment of the present disclosure. In this eye diagram, the differential signal VPI3–VPI4, in one embodiment, exhibits an eye-opening degree of approximately 150 mV for each distinct potential. In one embodiment, the eye diagram of the common mode signal ½(VPI3+VPI4) also showcased an eye-opening level of around 150 mV.

Figure 16A:
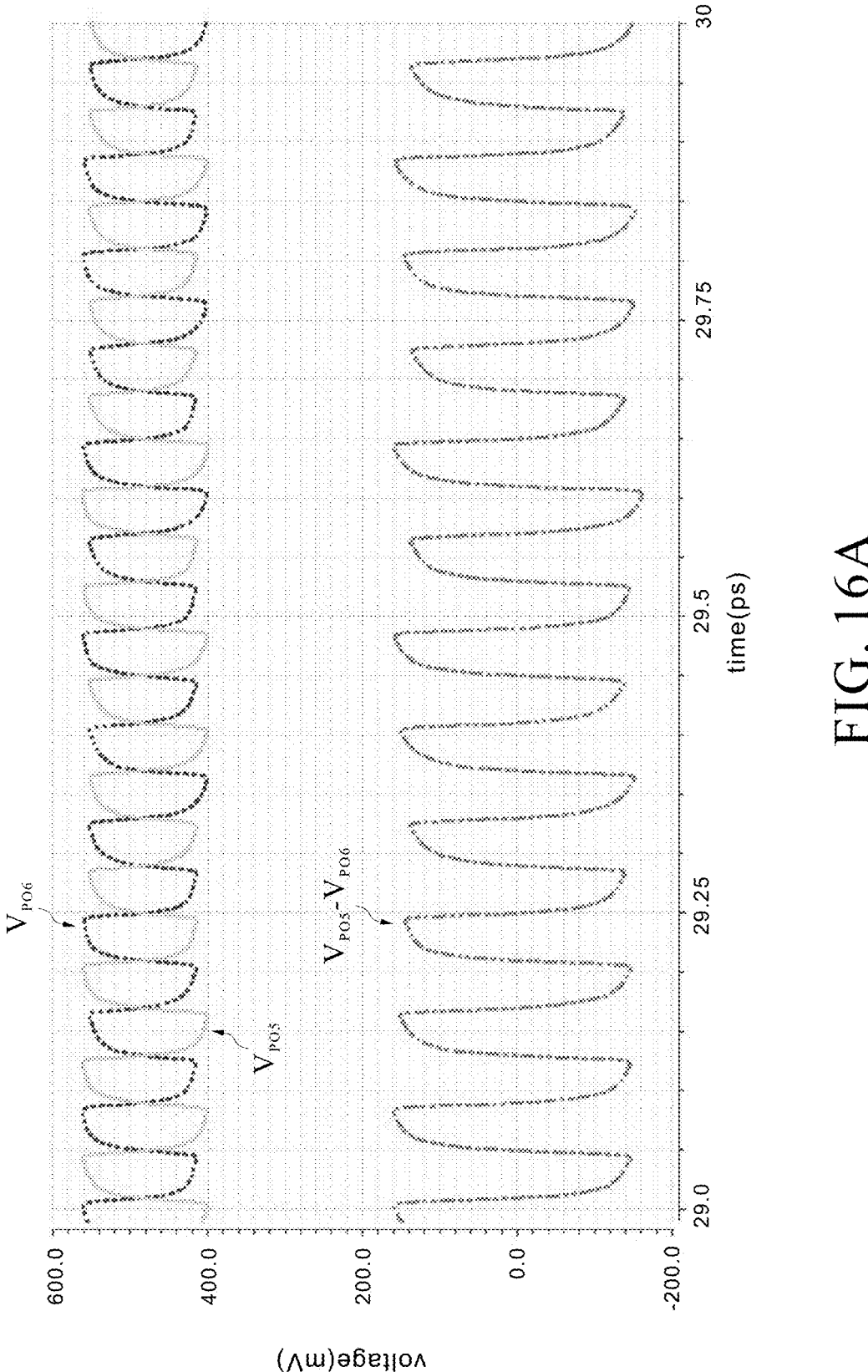
FIG. 16A illustrates a schematic diagram showing the voltage of the receiving terminal and the waveform of its differential signal in FIG. 3 according to a preferred embodiment of the present disclosure.

Please refer to FIG. 16A, which illustrates a schematic waveform diagram showing the voltages of the receiving endpoints PO5 and PO6 and the waveforms of their differential signals in FIG. 3 according to a preferred embodiment of the present disclosure. In FIG. 16A, it can be observed that the voltage VPO5 of the receiving endpoint PO5 and the voltage VPO6 of the receiving endpoint PO6 have an amplitude of approximately 160 mV. Moreover, the swing amplitude of the differential signal VPO5–VPO6 is approximately twice that, around 320 mV. This shows a more excellent anti-noise ability.

Figure 16B:
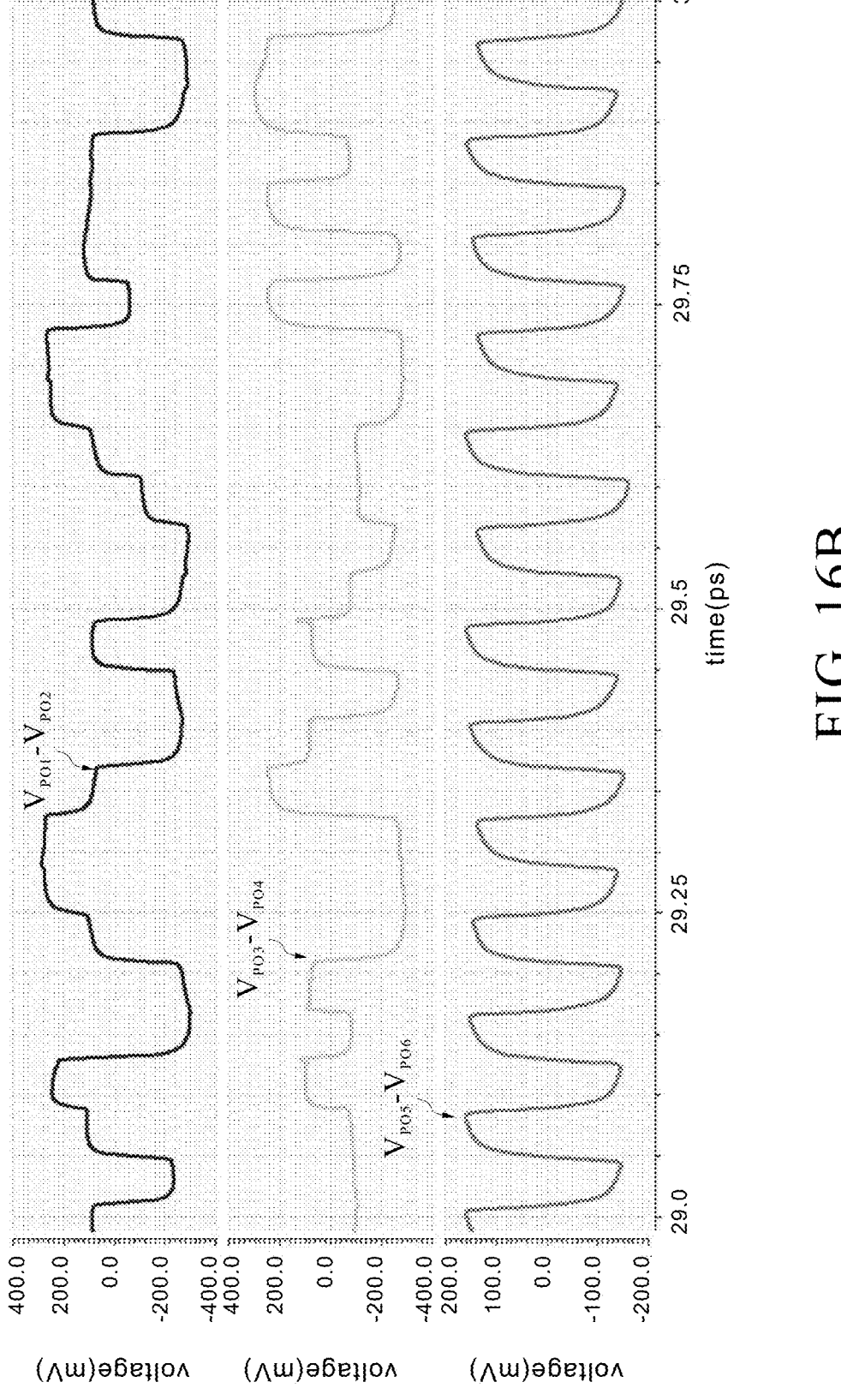
FIG. 16B illustrates a schematic waveform diagram of the differential signal at the receiving terminal in FIG. 3 according to a preferred embodiment of the present disclosure.

Please refer to FIG. 16B, which illustrates waveforms of the differential signals of the receiving endpoints PO1-PO6 of the schematic diagram in FIG. 3 according to a preferred embodiment of the present disclosure. From FIG. 16B, it can be observed that the swing amplitude of the differential signals VPO1–VPO2 and VP03–VPO4 is approximately 480 mV. The PAM-4 potential is divided into four different levels: −240 mV, −80 mV, 80 mV, and 240 mV. Additionally, the swing amplitude of the differential signal VP05–VPO6 is approximately 320 mV, and the NRZ potential is divided into −160 mV and 160 mV.

Figure 16C:
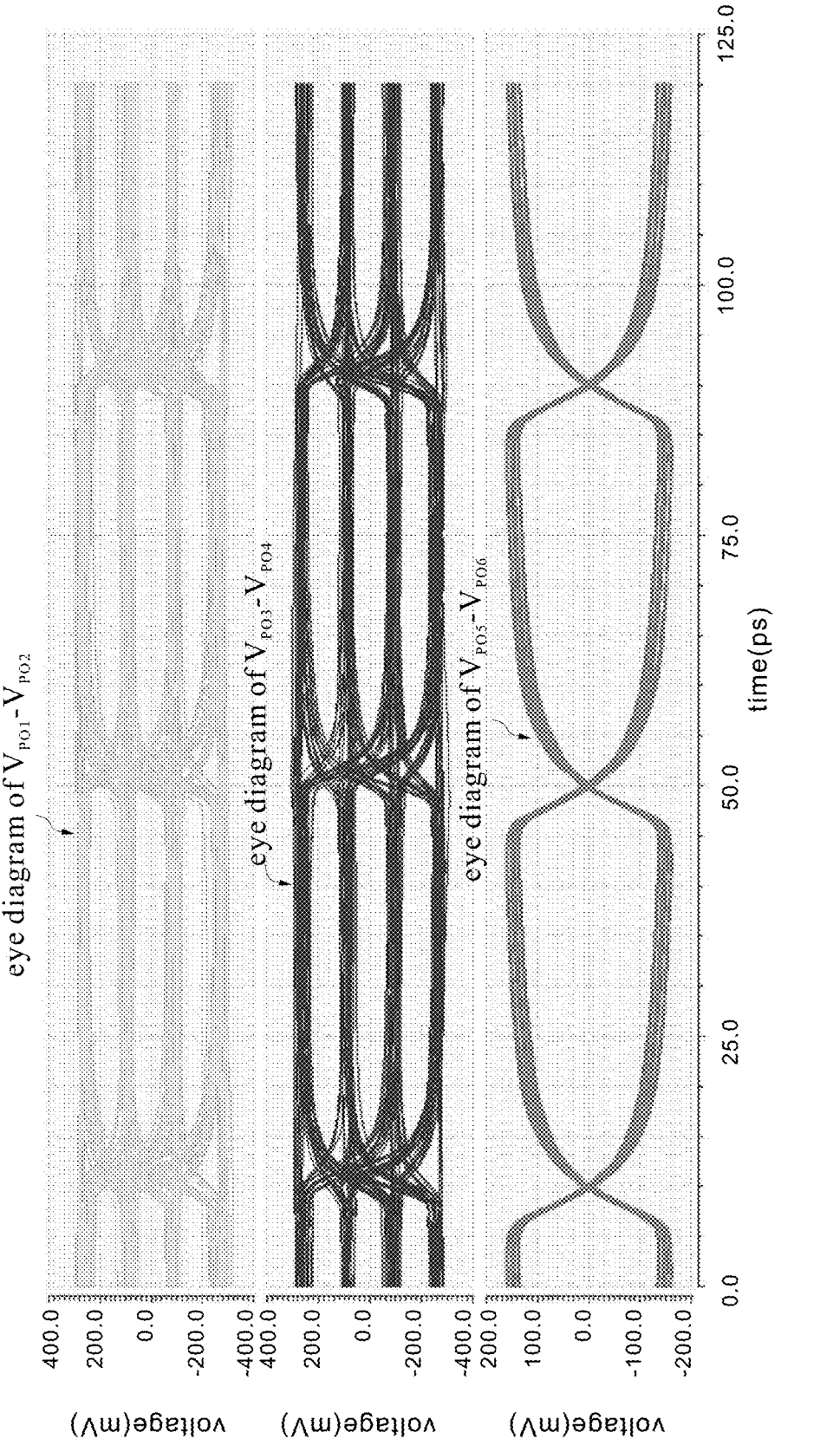
FIG. 16C is a schematic waveform diagram showing the eye diagram of the differential signal at the receiving end in FIG. 3 according to a preferred embodiment of the present disclosure.

Please refer to FIG. 16C, which illustrates eye diagrams of the differential signals of the receiving ends PO1-PO6 of the schematic diagram in FIG. 3 according to a preferred embodiment of the present disclosure. In the eye diagram of the differential signal VPO1–VPO2, the eye-opening degree for each distinct potential is slightly less than 160 mV. Similarly, in the eye diagram of the differential signal VPO3–VPO4, the eye-opening degree for each potential is slightly less than 160 mV. In the eye diagram of the differential signal VPO5–VPO6, the eye-opening degree is slightly less than 300 mV.

In any embodiment of the present disclosure, the circuit structure 10, 20, 30, 40, 50, 60, 70, 80, 90, 21, 31, 71 are capable of simultaneously transmitting a first data and a second data in the same differential channel. The differential signals VIP1, VIN1, VIP2, and VIN2 carries the pulse amplitude modulation 4 level (PAM-4) data, while the common mode signal carries the non-return-to-zero (NRZ) data. The NRZ data is synchronized with the PAM-4 data at the transmitting end. Furthermore, the circuit structures 10, 20, 30, 40, 50, 60, 70, 80, 90, 21, 31, 71 include a receiving end, which features a Clock Data Recovery (CDR) circuit (not shown). The CDR circuit extracts a clock from the NRZ data, which is used to sample both the NRZ and PAM4 data.

Please refer to FIG. 17, which illustrates a method S10 of transmitting signals in a differential channel according to a preferred embodiment of the disclosure. The method includes the following steps: providing a differential channel with a differential mode impedance and a common mode impedance, wherein the differential channel includes a first end and a second end (S101); providing a termination circuit including a third end and a fourth end, which are connected respectively to the first and second ends of the differential channel (S102); Adjusting the termination circuit to simultaneously match the differential mode impedance and the common mode impedance of the differential channel (S103); providing a first input signal and a second input signal (S104); and forming a differential signal at the first end and the second end of the differential channel in response to the first input signal, and simultaneously forming a common mode signal at the first end and the second end of the differential channel in response to the second input signal, so that the differential signal and the common mode signal are superimposed on the first end and the second end (S105).

Figure 18:
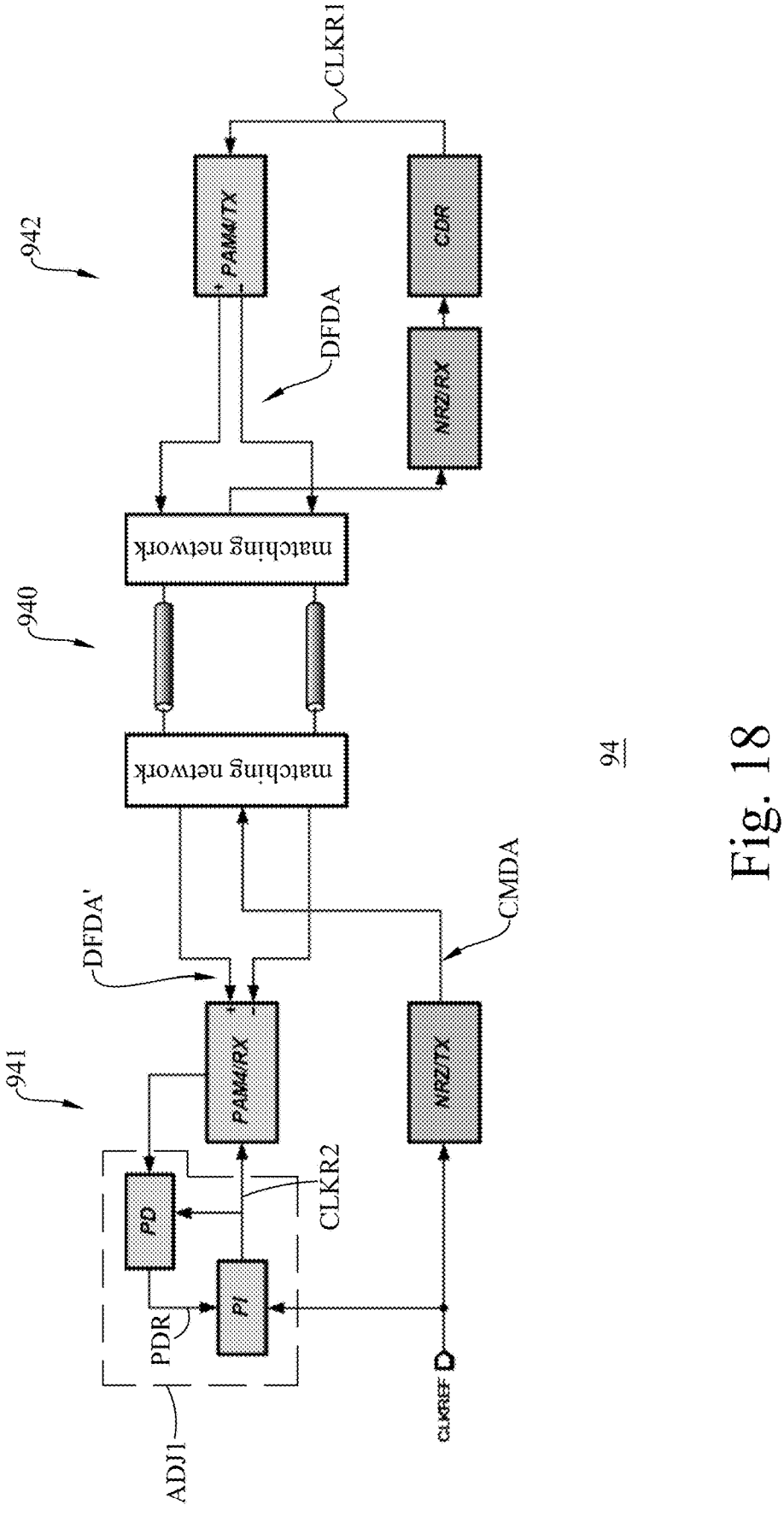
FIG. 18 is a schematic diagram of utilizing extracted clock from CDR for the reference clock of the differential signal in a differential circuit structure according to a preferred embodiment of the present disclosure.

Please refer to FIG. 18, which illustrates a schematic diagram of utilizing the CDR extraction clock as the reference clock of the differential signal DFDA in a differential circuit structure 94 according to a preferred embodiment of the present disclosure. The differential circuit structure 94 includes a differential signal receiving terminal/a common mode signal driving terminal 941, a differential channel 940, and a common mode signal receiving terminal/a differential signal driving terminal 942. In this configuration, a differential signal DFDA and a common mode signal CMDA are simultaneously transmitted in an opposite direction in a set of differential channels 940. The clock data recovery of the common mode signal receiving terminal 942, such as the non-return-to-zero signal receiving end NRZ/RX, extracts the clock and uses it as the reference clock for the differential signal DFDA, as shown in FIG. 18. The common-mode signal CMDA driving terminal 941 on the left side serves as the non-return-to-zero signal transmitting terminal NRZ/TX to transmit the NRZ data. The common mode signal receiving terminal 942 on the right side includes, for example, a non-return-to-zero signal receiving end NRZ/RX and an ultra-wideband CDR circuit. This CDR circuit extracts a clock from the NRZ data, and employs it as the reference clock for the driving terminal 942, such as the pulse amplitude modulation signal transmitting end PAM4/TX, which handles the differential signal DFDA. Since the system's operating speed in this differential circuit structure 94 is determined by the first reference clock CLKREF on the left side, the left differential signal DFDA receiving terminal 941 can directly perform phase detection for the first reference clock CLKREF using a phase detector PD. It then utilizes a phase interpolator PI to perform the phase interpolation and sample the pulse amplitude modulation data received by the pulse amplitude modulation signal receiving end PAM4/RX, without requiring sophisticated frequency detection. This approach significantly reduces the complexity of the pulse amplitude modulation receiving end PAM4/RX and facilitates ultra-wideband data transmission.

In any embodiment of the present disclosure, the differential signal DFDA represents a differential data, and the first reference clock CLKREF has a first phase. The differential data DFDA receiving terminal 941 is equipped with a phase correction circuit ADJ1. This phase correction circuit ADJ1 utilizes the first reference clock CLKREF to generate a second signal clock CLKR2, which has an adjustable phase for optimally sampling the differential data DFDA. The second signal clock CLKR2 possesses a second phase. The phase correction circuit ADJ1 includes a phase detector PD and a phase interpolator PI. The phase detector PD detects the phase relationship between the second signal clock CLKR2 and the differential signal DFDA' of the differential data receiving terminal 941. Based on the phase detection result PDR obtain from the phase detector PD, the phase interpolator PI adjusts the phase difference between the first phase and the differential signal DFDA'. The differential signals DFDA and DFDA' are pulse amplitude modulation (PAM) signals, e.g. 4-level PAM signal, and the common mode signal CMDA is a non-return-to-zero (NRZ) signal, e.g. a 2-level NRZ signal.

Figure 19:
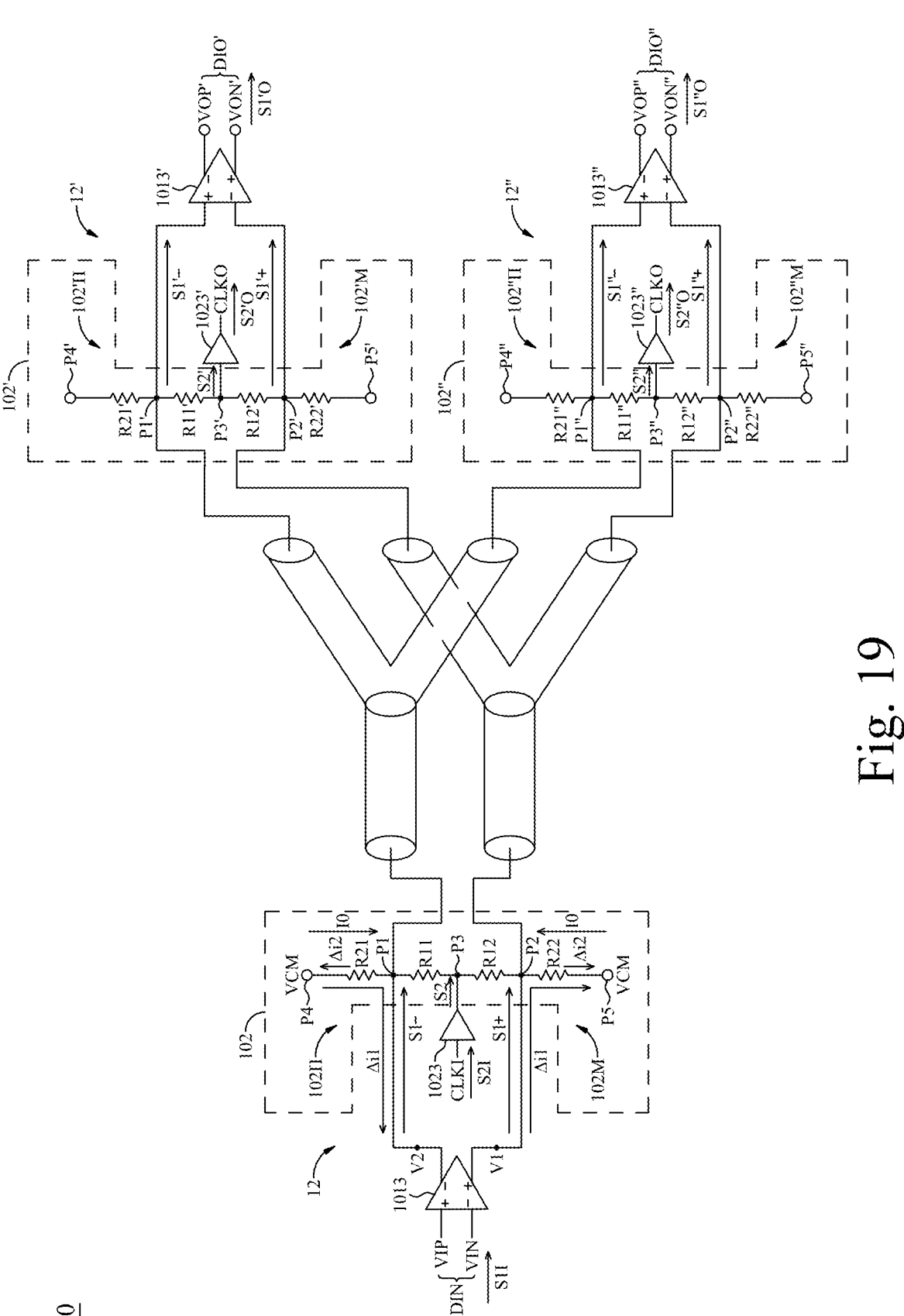
FIG. 19 is a Y-type network channel according to a preferred embodiment of the present disclosure.
Figure 20:
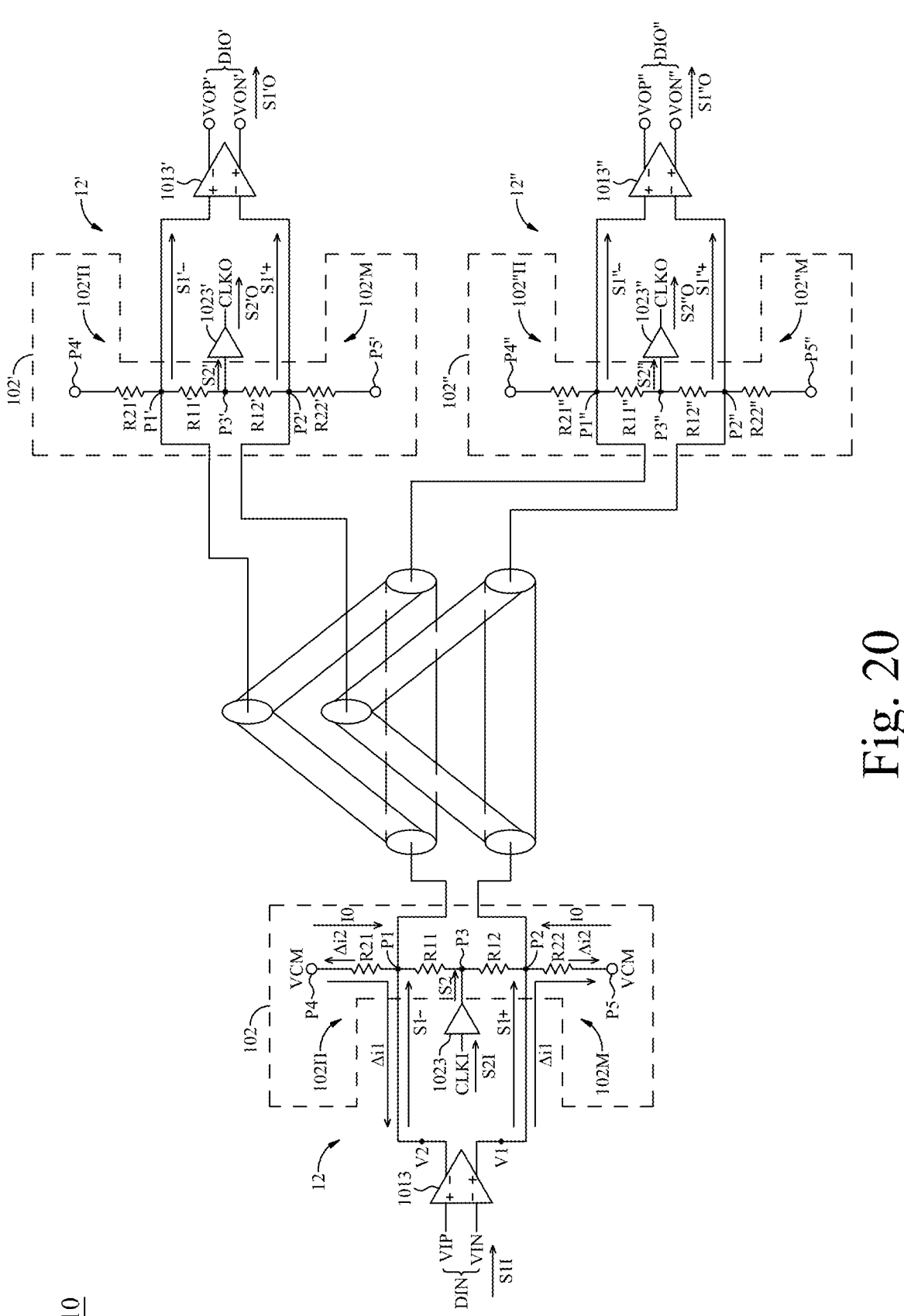
FIG. 20 is a 4-type network channel according to a preferred embodiment of the present disclosure.

In any embodiment of the present disclosure, the invention is also applicable to multi-terminal channels. For example, a three-terminal channel is one example of a multi-terminal channel. It can be in the form of a Y-type network channel (as shown in FIG. 19) or a Δ-type network channel (as shown in FIG. 20). In such configurations, any of the three terminals of the Y-type network/Δ-type network channel can transmit and/or receive the differential signals and/or the common mode signals. Each terminal can function as a driving terminal or a receiving terminal for the differential signal or the common mode signal.

It should be noted that while the invention has been described in terms of is the presently considered practical and preferred embodiments, it is not limited to these disclosed embodiments. The scope of the invention encompasses various modifications and similar arrangements that fall within the spirit and scope of the appended claims. The interpretation of these claims is intended to be broad, encompassing all such modifications and similar structures.

What is claimed is:

1. A method for constructing a signal transmission in a differential channel, the method comprising:

providing the differential channel having a differential mode impedance and a common mode impedance, wherein the differential channel includes a first end and a second end;

providing a termination circuit including a third end and a fourth end connected respectively to the first and second ends of the differential channel;

causing the termination circuit to simultaneously match the differential mode impedance and the common mode impedance of the differential channel;

providing a first input signal and a second input signal; and forming a differential signal at the first end and the second end of the differential channel in response to the first input signal, and simultaneously forming a common mode signal at the first end and the second end of the differential channel in response to the second input signal, so that the differential signal and the common mode signal are superimposed on the first end and the second end, wherein:

the differential channel has an odd mode propagation delay, an even mode propagation delay, an odd mode impedance parameter, and an even mode impedance parameter, and the termination circuit has an impedance-matching parameter;

the impedance-matching parameter includes a first resistance value and a second resistance value; and the method further comprises:

on a condition that the odd mode propagation delay and the even mode propagation delay are equal, determining a first predetermined number relationship between the odd mode impedance parameter and the even mode impedance parameter; and on a condition that the differential channel and an impedance-matching terminal circuit are impedance matched, determining a second predetermined number relationship between the first resistance value and at least one of the odd mode impedance parameter and the even mode impedance parameter, and determining a third predetermined number relationship between the second resistance value and at least one of the odd mode impedance parameter and the even mode impedance parameter.

\* \* \* \* \*